United States Patent
Jeong

(10) Patent No.: US 10,816,239 B2
(45) Date of Patent: Oct. 27, 2020

(54) HEAT EXCHANGER

(71) Applicant: KYUNGDONG NAVIEN CO., LTD., Pyeongtaek-si, Gyeonggi-do (KR)

(72) Inventor: Inchul Jeong, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 348 days.

(21) Appl. No.: 15/746,698

(22) PCT Filed: Jul. 15, 2016

(86) PCT No.: PCT/KR2016/007714
§ 371 (c)(1),
(2) Date: Jan. 22, 2018

(87) PCT Pub. No.: WO2017/014497
PCT Pub. Date: Jan. 26, 2017

(65) Prior Publication Data
US 2018/0209690 A1    Jul. 26, 2018

(30) Foreign Application Priority Data
Jul. 23, 2015    (KR) .......................... 10-2015-0104094

(51) Int. Cl.
*F24H 8/00* (2006.01)
*F24H 1/34* (2006.01)
(Continued)

(52) U.S. Cl.
CPC .................. *F24H 8/00* (2013.01); *F24H 1/30* (2013.01); *F24H 1/32* (2013.01); *F24H 1/34* (2013.01);
(Continued)

(58) Field of Classification Search
CPC ....................................................... F24H 8/00
See application file for complete search history.

(56) References Cited

U.S. PATENT DOCUMENTS

| | | | | |
|---|---|---|---|---|
| 5,587,053 A | * | 12/1996 | Keith ..................... | B01D 1/221 159/28.6 |
| 2010/0162967 A1 | * | 7/2010 | Taylor ...................... | F24H 1/32 122/367.1 |

(Continued)

FOREIGN PATENT DOCUMENTS

| AT | 402668 B | * | 7/1997 |
|---|---|---|---|
| CN | 203550720 U | | 4/2014 |

(Continued)

*Primary Examiner* — Nathaniel Herzfeld
(74) *Attorney, Agent, or Firm* — Stein IP, LLC

(57) ABSTRACT

The present invention relates to a heat exchanger enabling the reduction of the number of components constituting the heat exchanger, the simplification of the coupling structure thereof, and also, the decrease of combustion gas flow resistance and the minimization of noise and vibration generation, the heat exchanger being provided with a heat exchange unit having heating medium flow channels through which a heating medium flows and combustion gas flow channels through which combustion gas combusted in the burner flows to be alternately formed and adjacent to each other in spaces between a plurality of plates, wherein the heat exchange unit comprises: a sensible heat unit which surrounds the outer side of a combustion chamber, is formed of one side area of the plates, and heats the heating medium by using sensible heat of combustion gas generated by the combustion of the burner; and a latent heat unit which is formed of the other side area of the plates, and heats the heating medium by using latent heat of water vapor included in combustion gas that has finished undergoing heat exchange in the sensible heat unit, wherein bent flange units are formed on the edges of the plurality of plates, and in a state where the flange units of neighboring plates overlap, certain areas among the edges of the plurality of plates have formed thereon combustion gas pass-through units having (Continued)

combustion gas flowing through the combustion gas flow channels pass therethrough.

19 Claims, 20 Drawing Sheets

(51) Int. Cl.
  *F28D 9/00* (2006.01)
  *F24H 1/32* (2006.01)
  *F28D 21/00* (2006.01)
  *F28F 3/04* (2006.01)
  *F24H 1/30* (2006.01)
  *F24H 1/44* (2006.01)
  *F24H 1/40* (2006.01)
(52) U.S. Cl.
  CPC ............... *F24H 1/40* (2013.01); *F24H 1/445* (2013.01); *F28D 9/00* (2013.01); *F28D 9/005* (2013.01); *F28D 9/0037* (2013.01); *F28D 9/0043* (2013.01); *F28D 9/0093* (2013.01); *F28D 21/0007* (2013.01); *F28F 3/04* (2013.01); *F28F 3/044* (2013.01); *F28F 3/046* (2013.01); *F24H 1/44* (2013.01); *F28D 2021/0061* (2013.01); *Y02B 30/00* (2013.01)

(56) References Cited

U.S. PATENT DOCUMENTS

2011/0303400 A1* 12/2011 Scearce ................. F28D 9/0012
  165/164
2012/0055421 A1* 3/2012 Rausch ..................... F24H 1/43
  122/231

FOREIGN PATENT DOCUMENTS

| CN | 104755873 A | 7/2015 |
| JP | 2001-99590 A | 4/2001 |
| JP | 3487601 B2 | 1/2004 |
| JP | 2006-214628 A | 8/2006 |
| KR | 10-2010-0054383 A | 5/2010 |
| KR | 10-2012-0045249 A | 5/2012 |
| KR | 10-2013-0052912 A | 5/2013 |
| KR | 10-2015-0082488 A | 7/2015 |
| WO | WO 2008/107760 A2 | 9/2008 |

* cited by examiner

[FIG. 1]
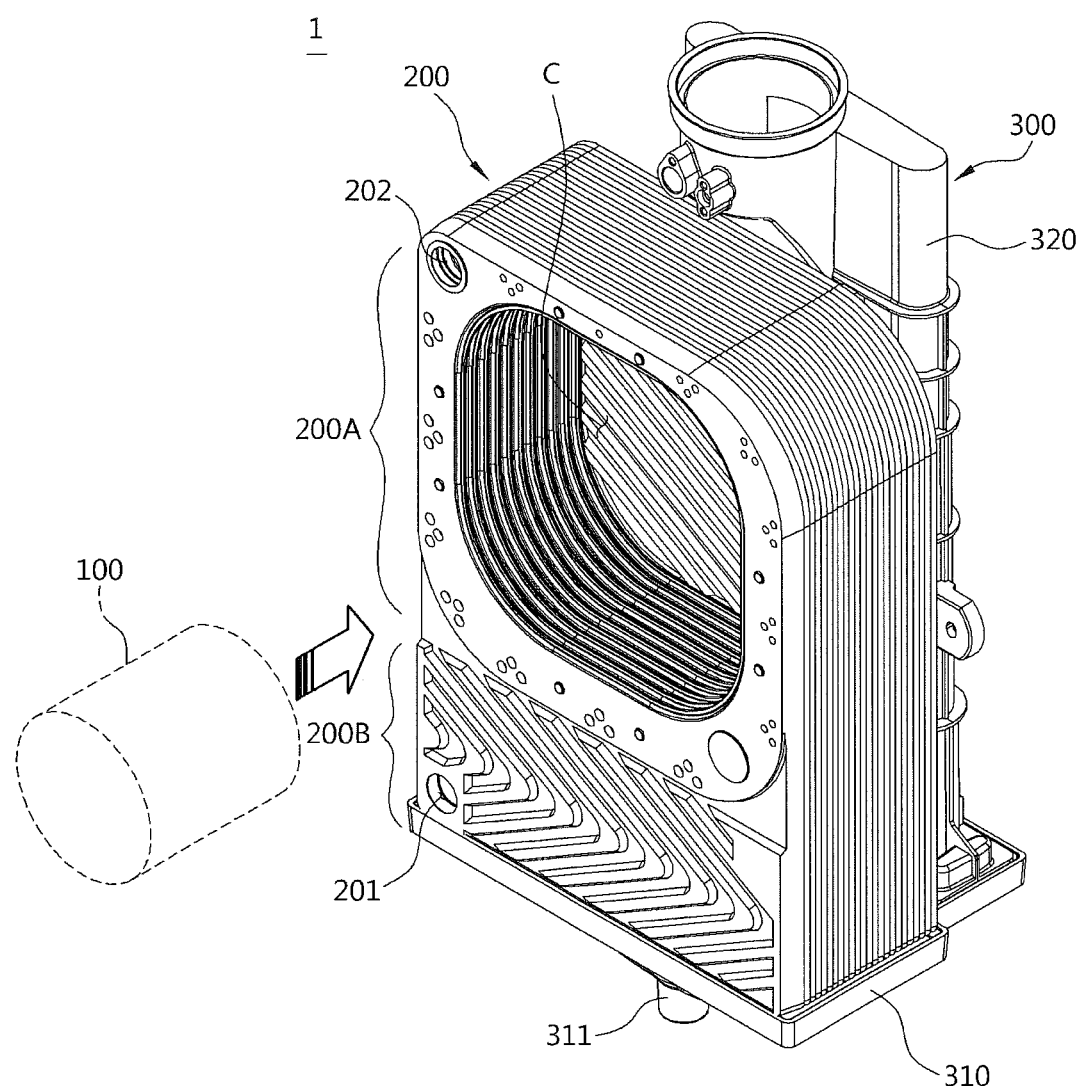

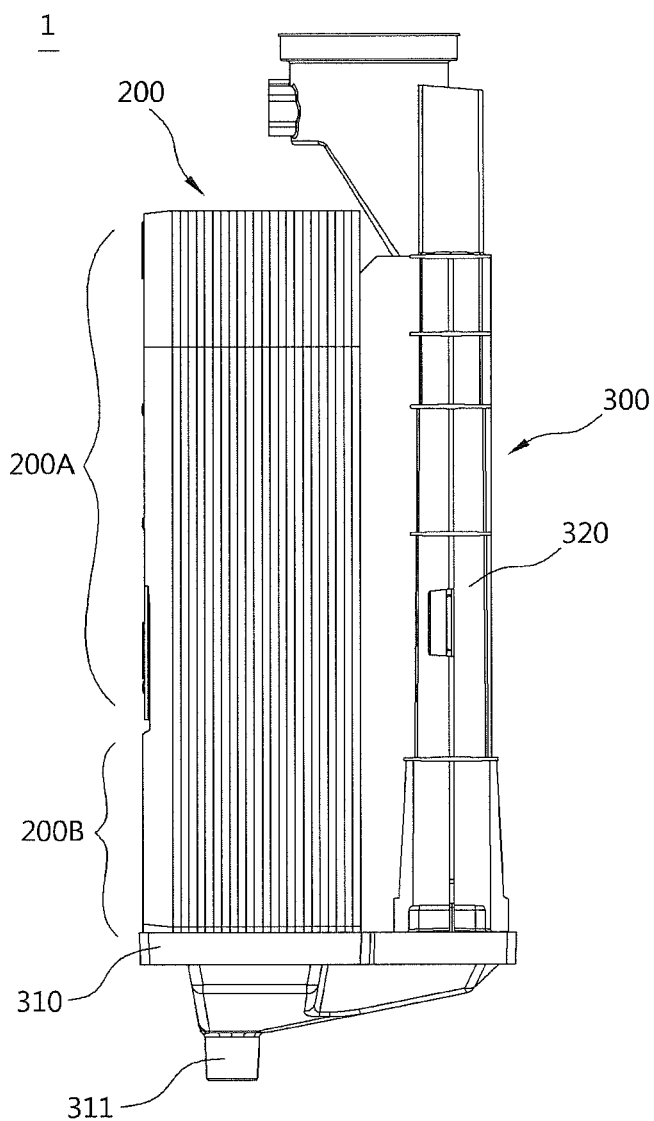
[FIG. 2]

[FIG. 3]
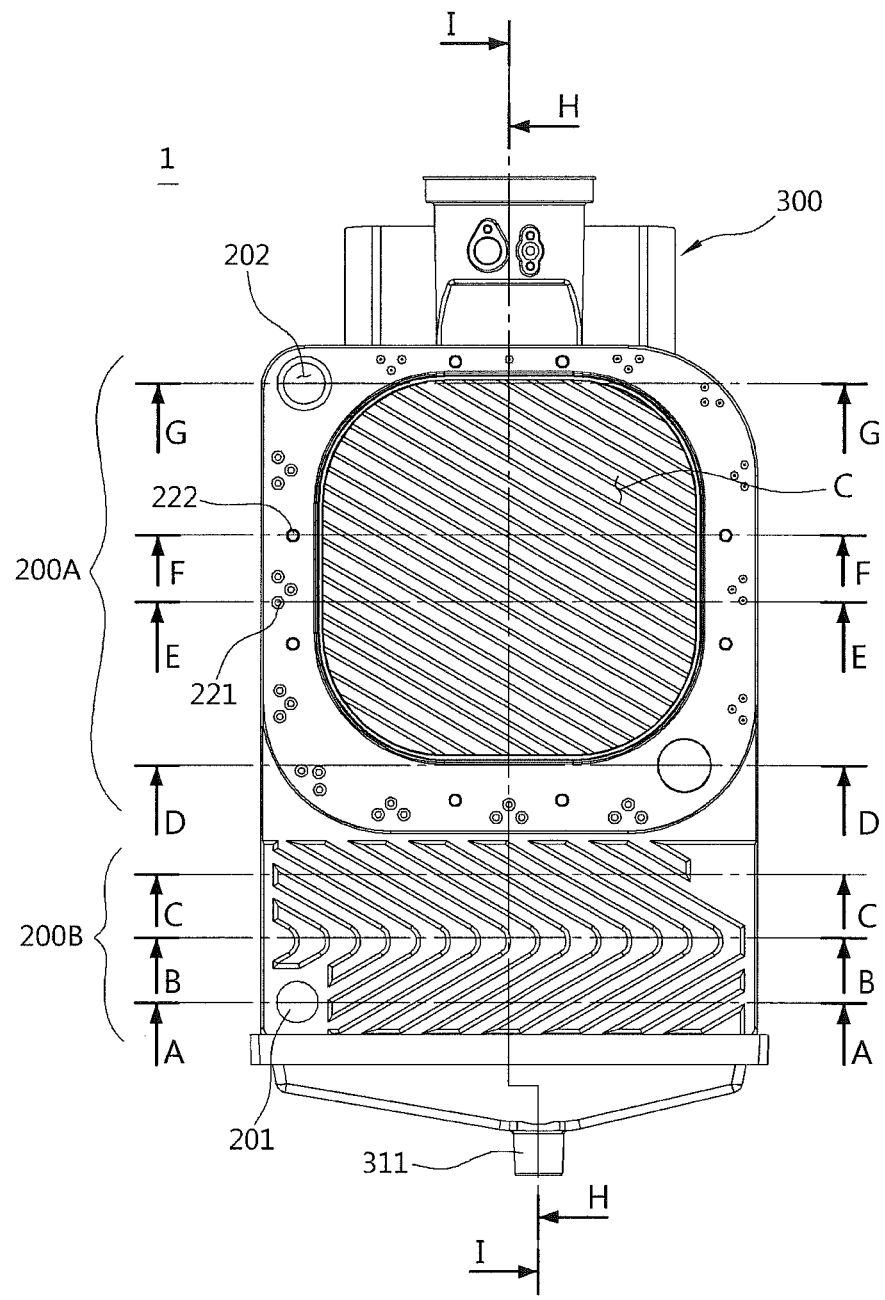

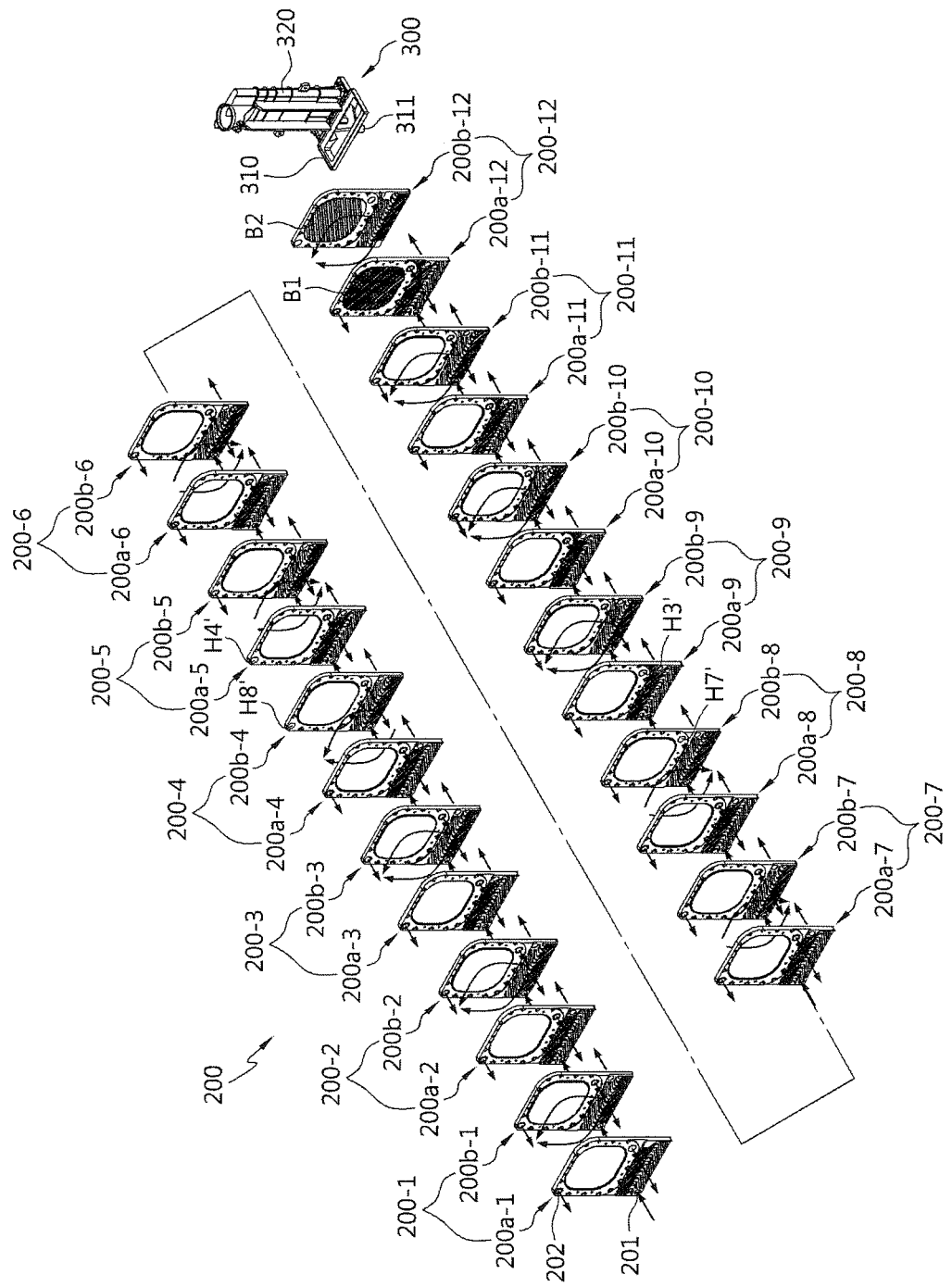

[FIG. 5]
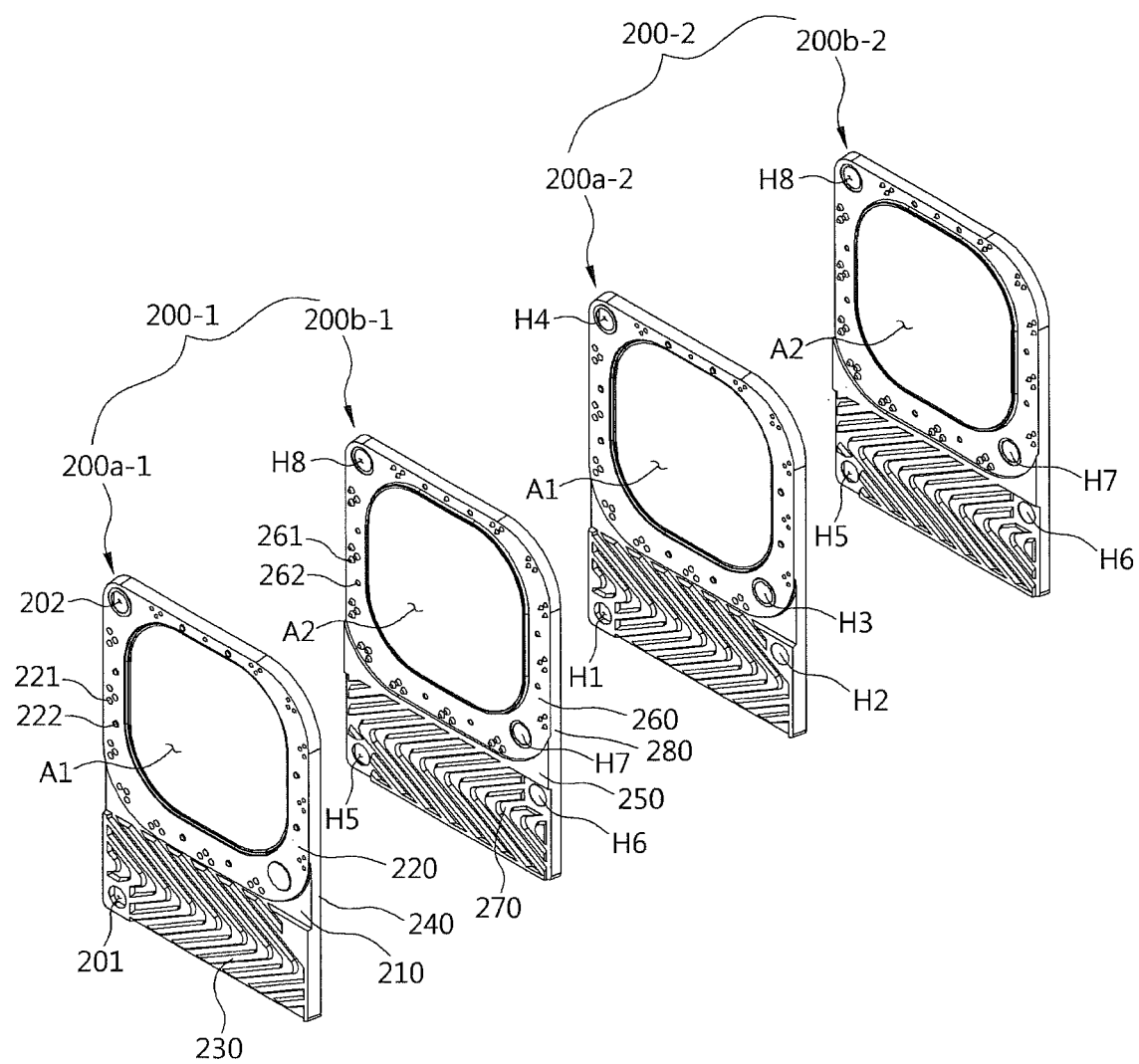

[FIG. 6]
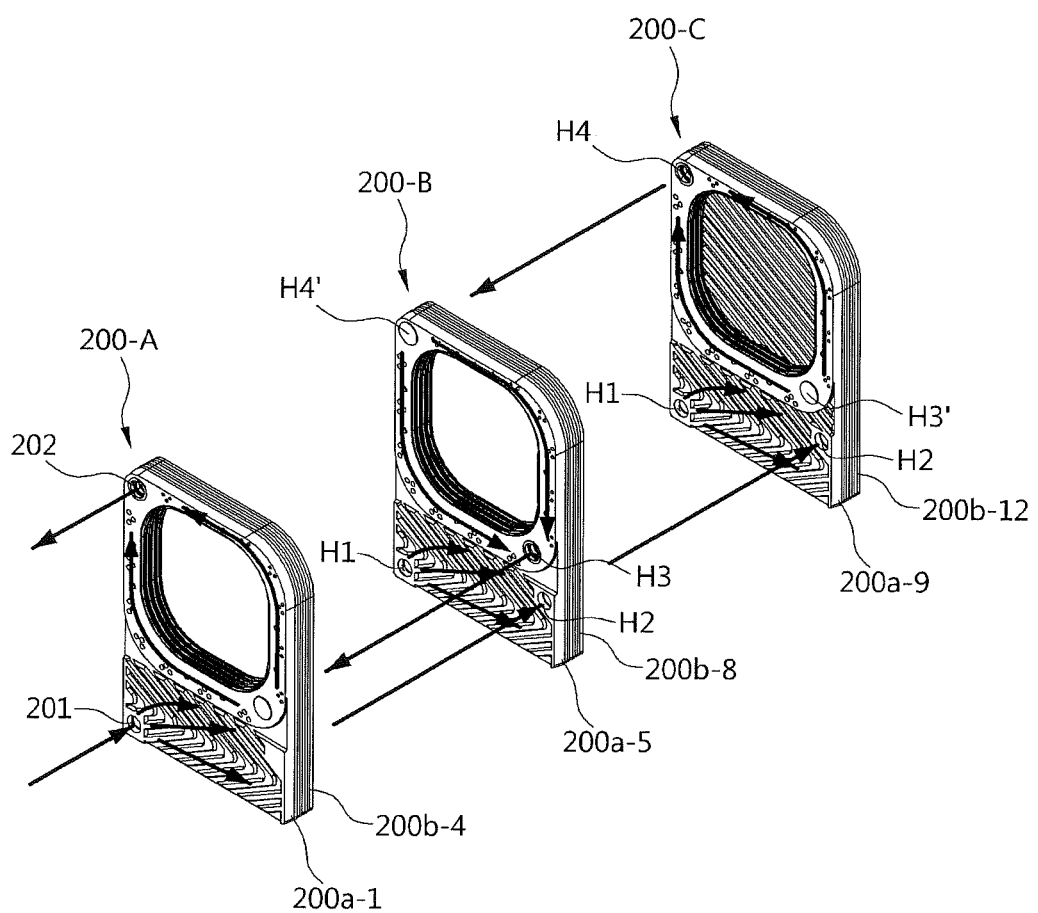

[FIG. 7]
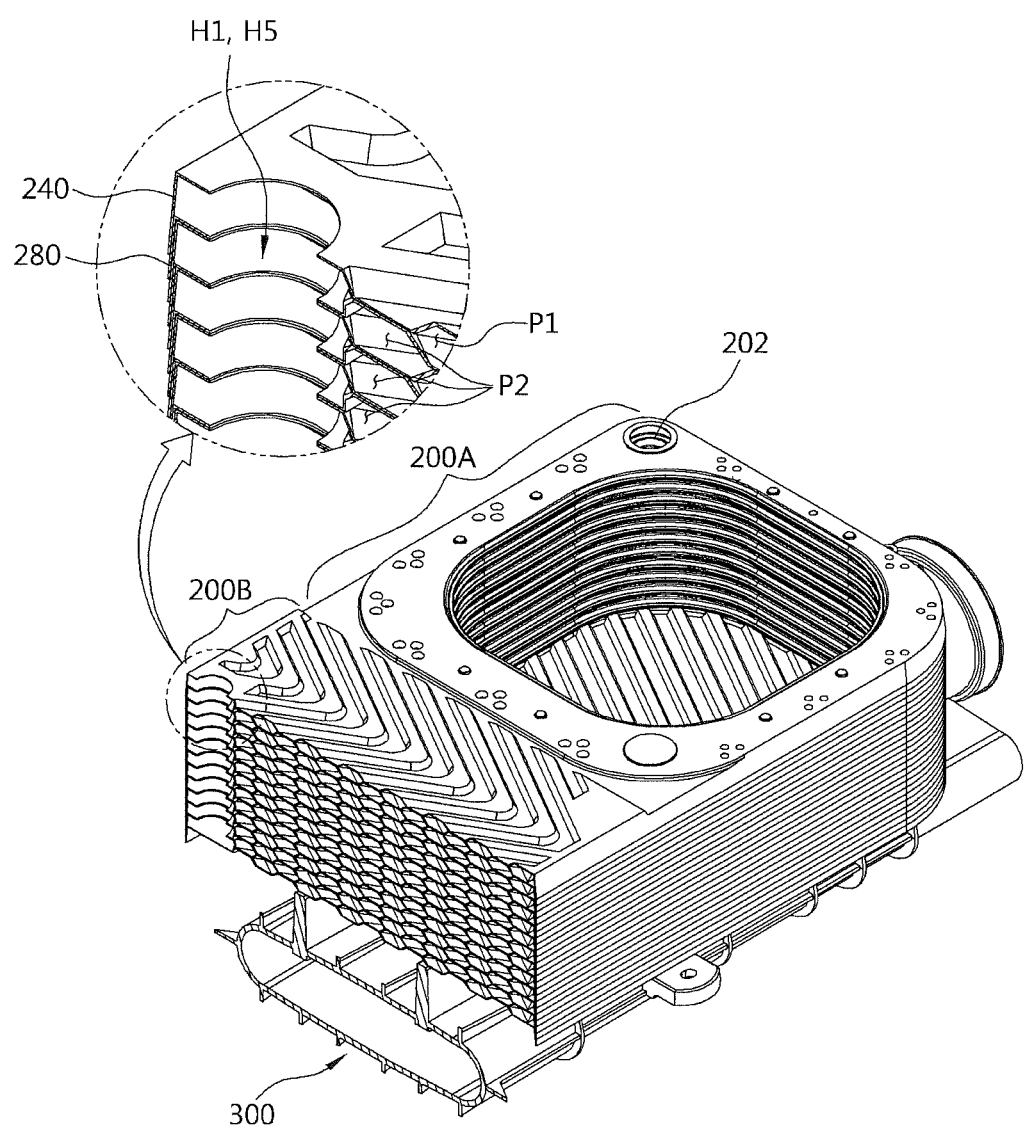

[FIG. 8]
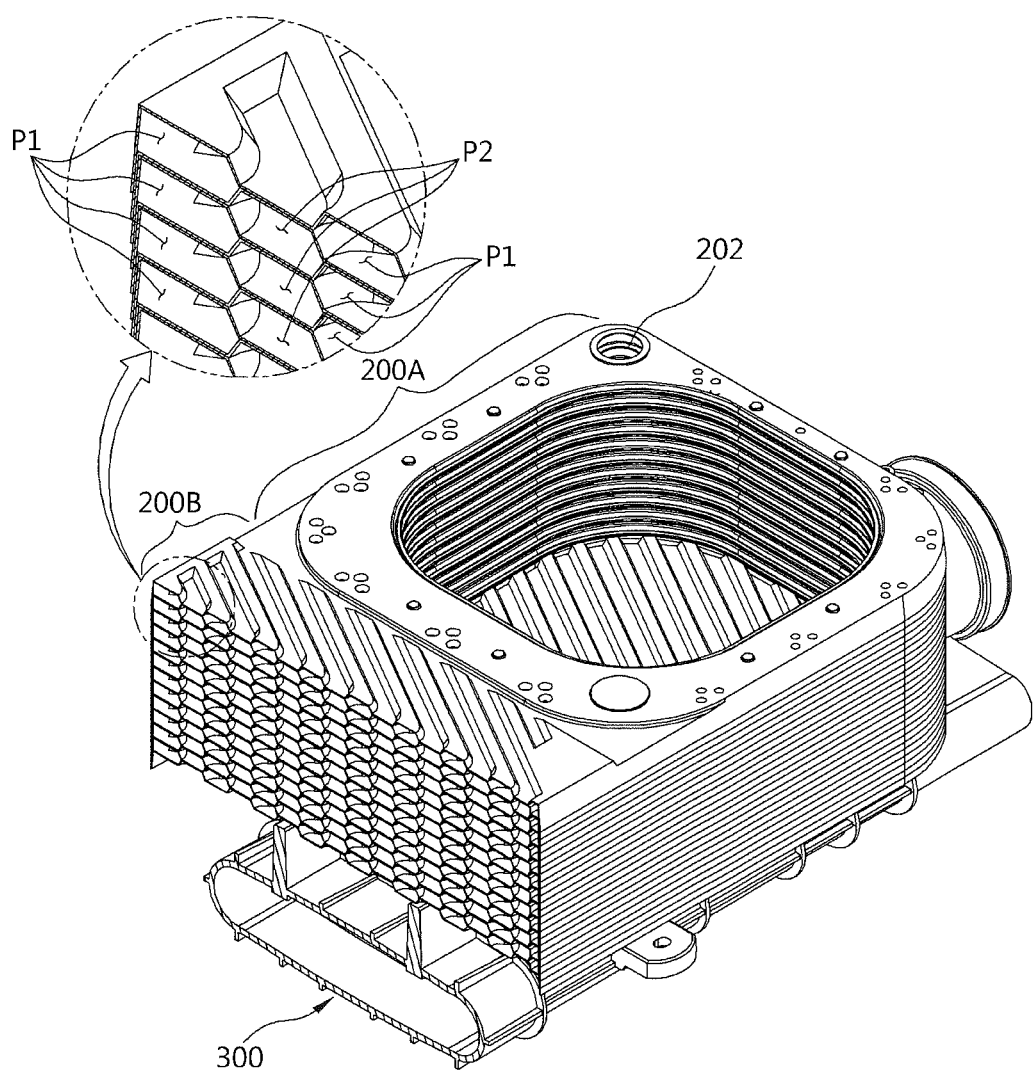

[FIG. 9]
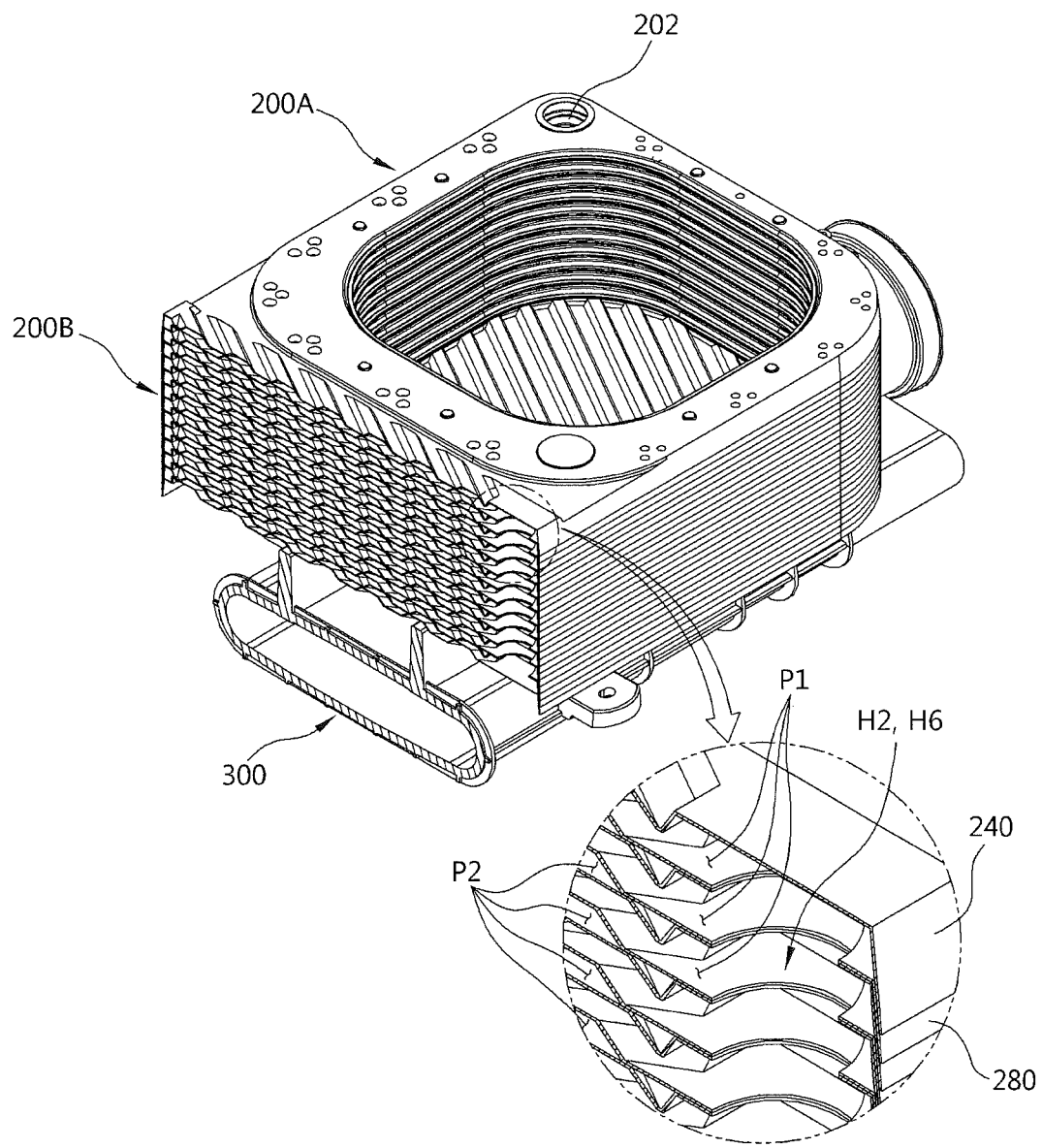

[FIG. 10]
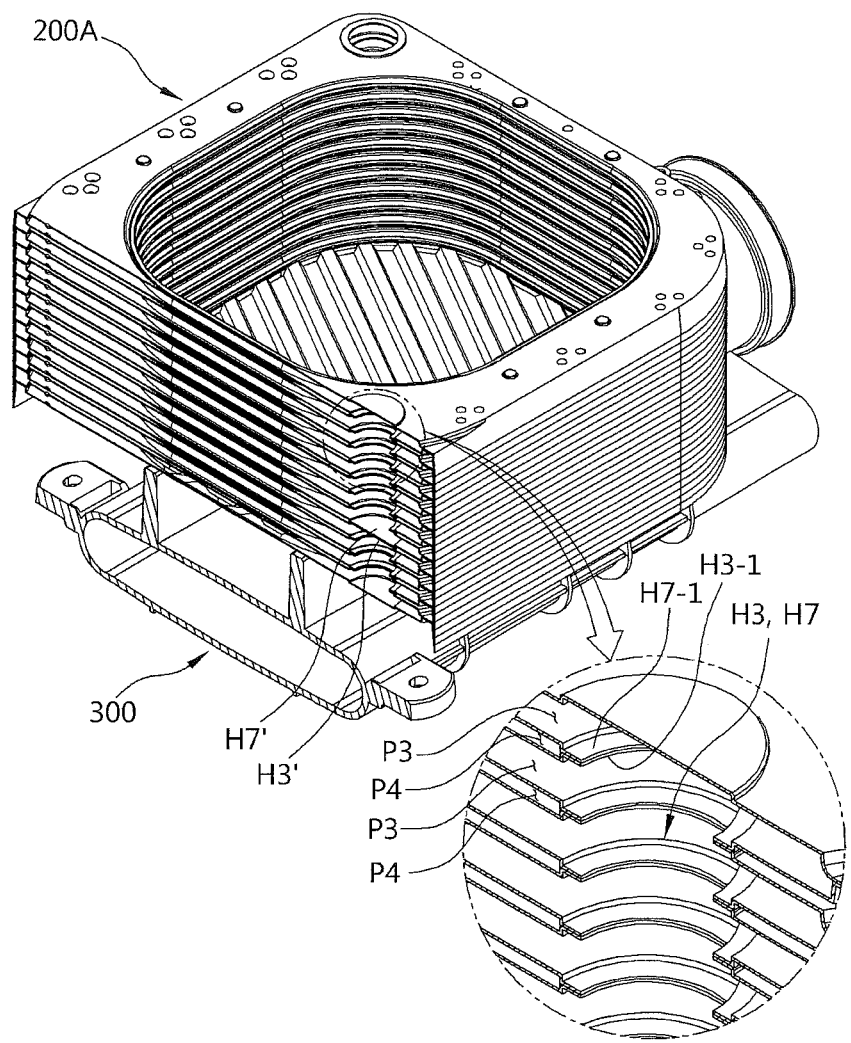

[FIG. 11]
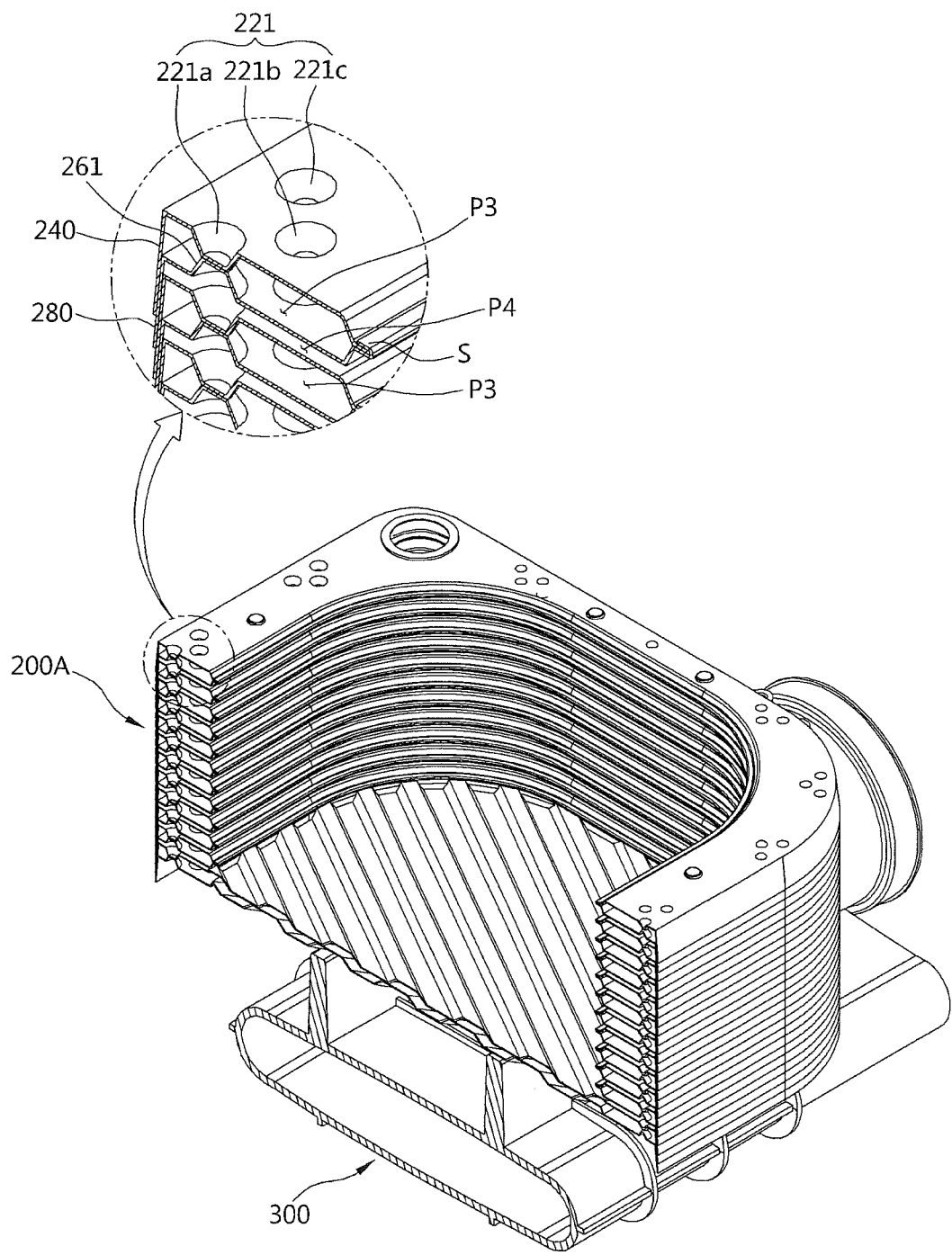

[FIG. 12]
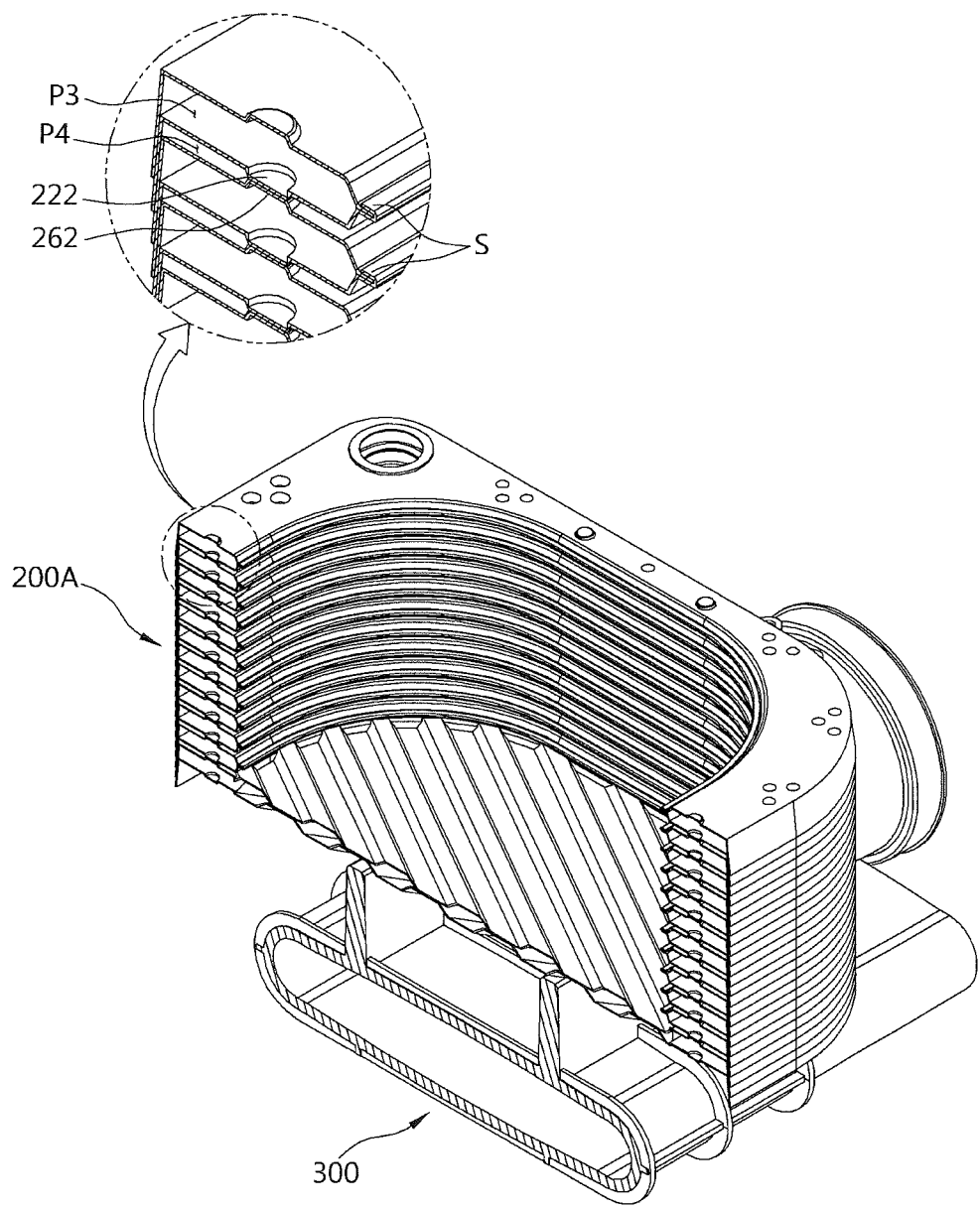

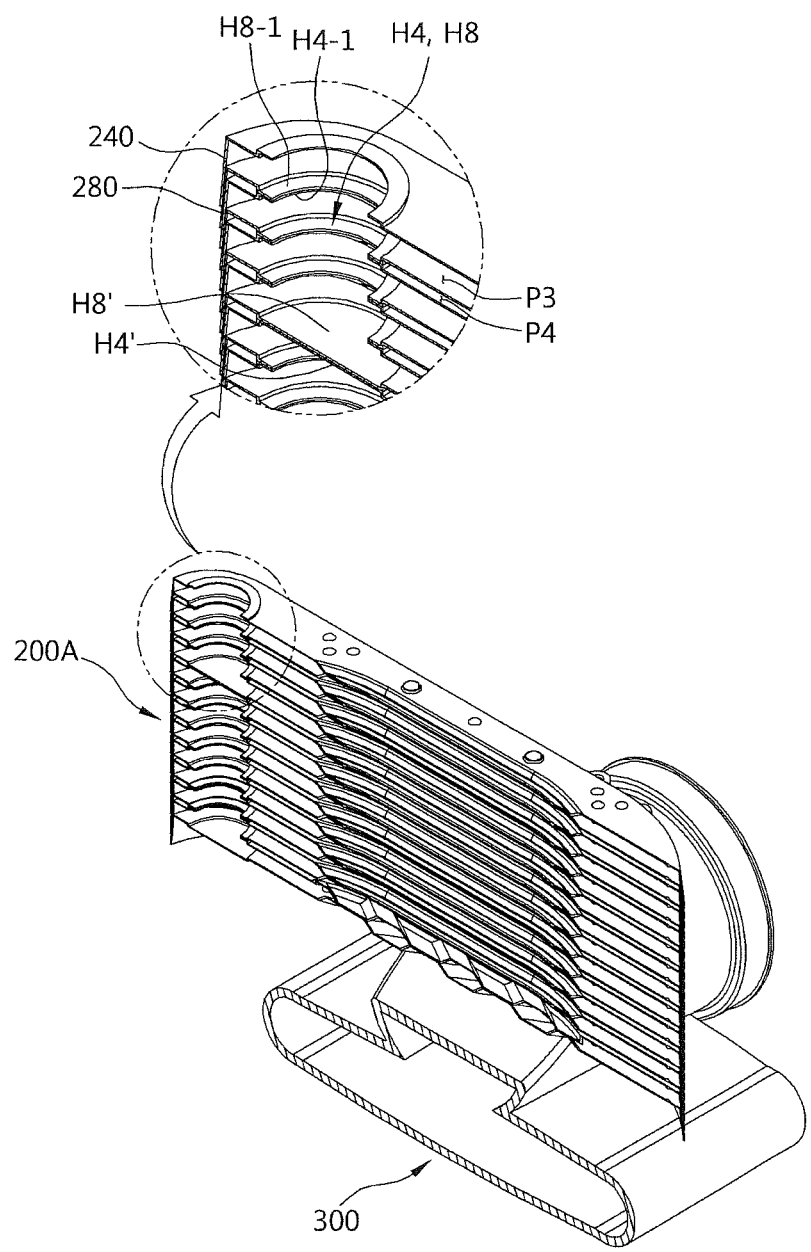
[FIG. 13]

[FIG. 14]
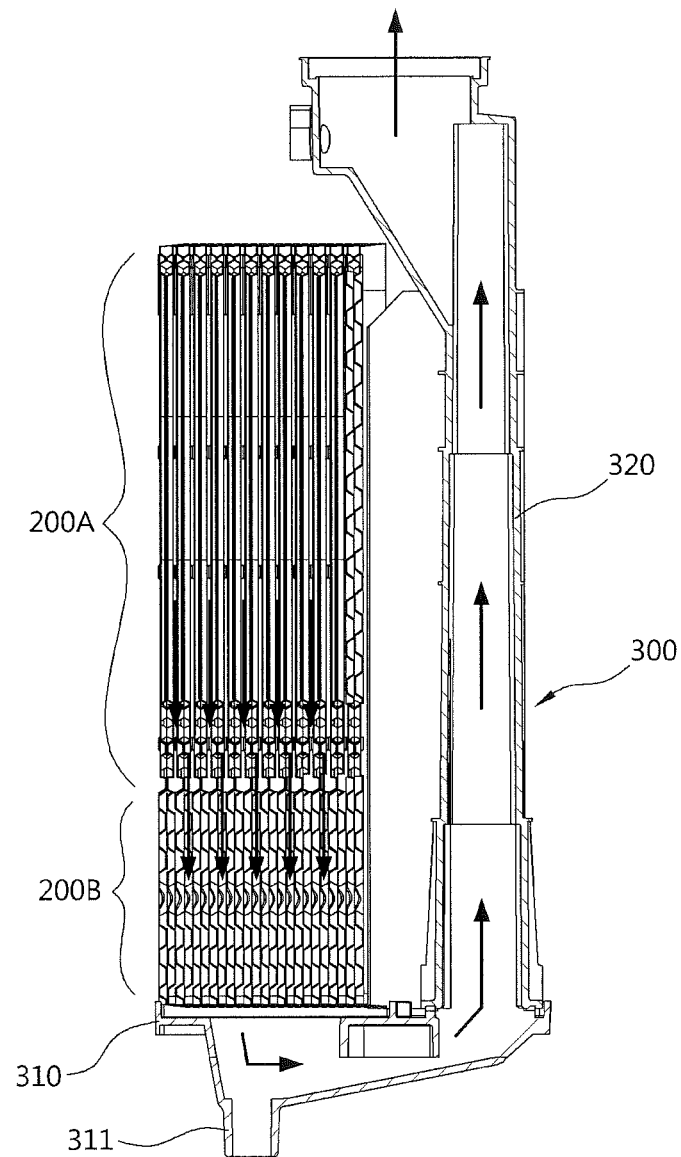

[FIG. 15]
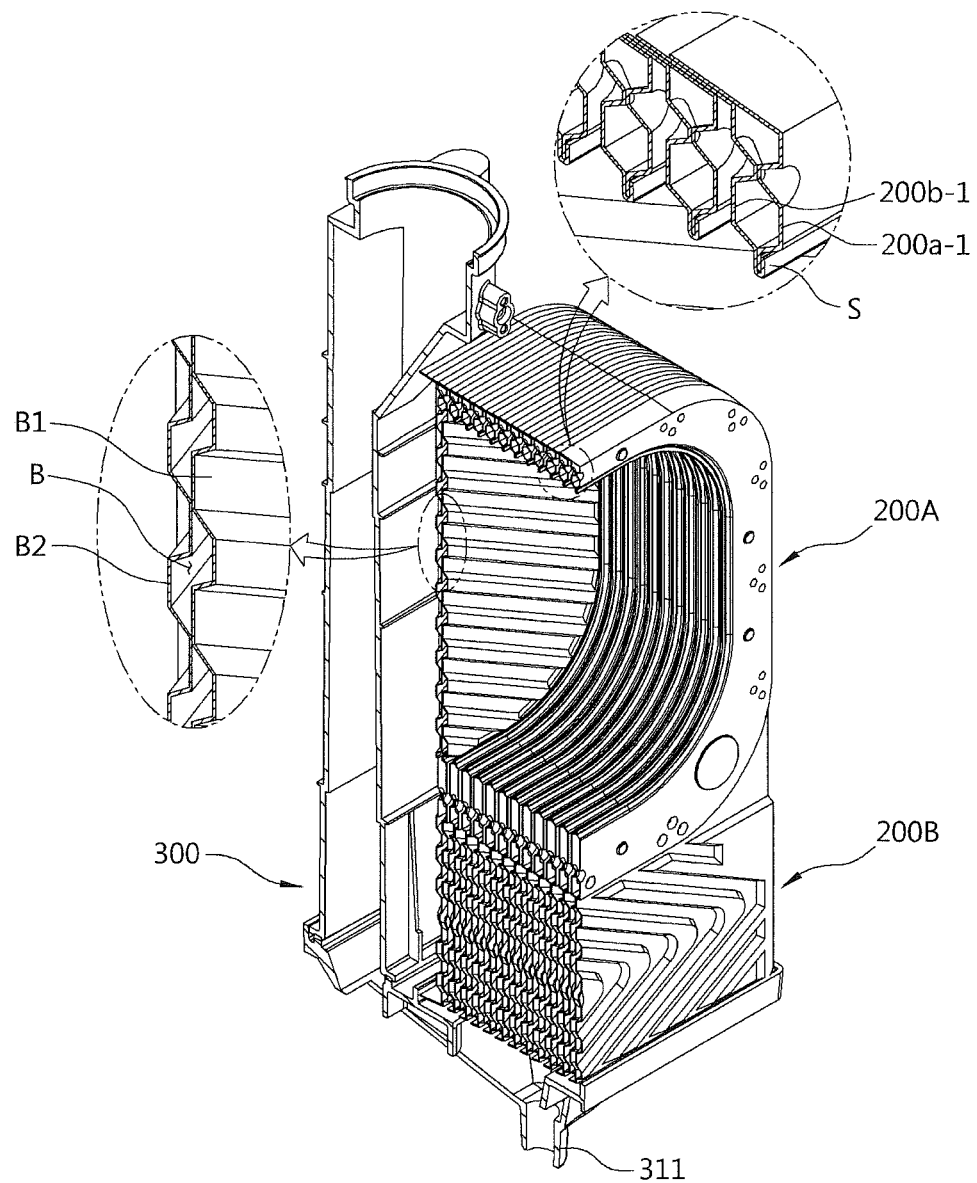

[FIG. 16]
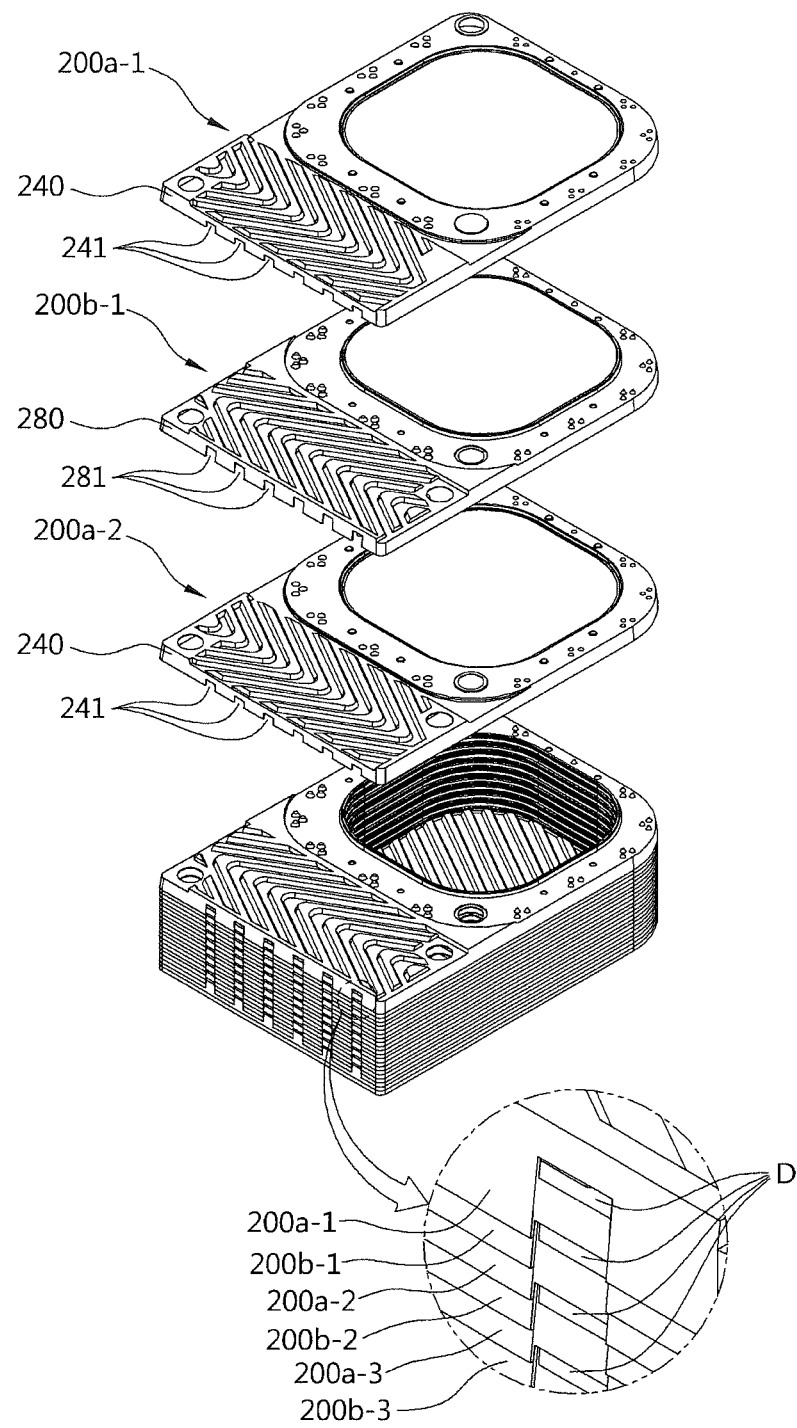

[FIG. 17]
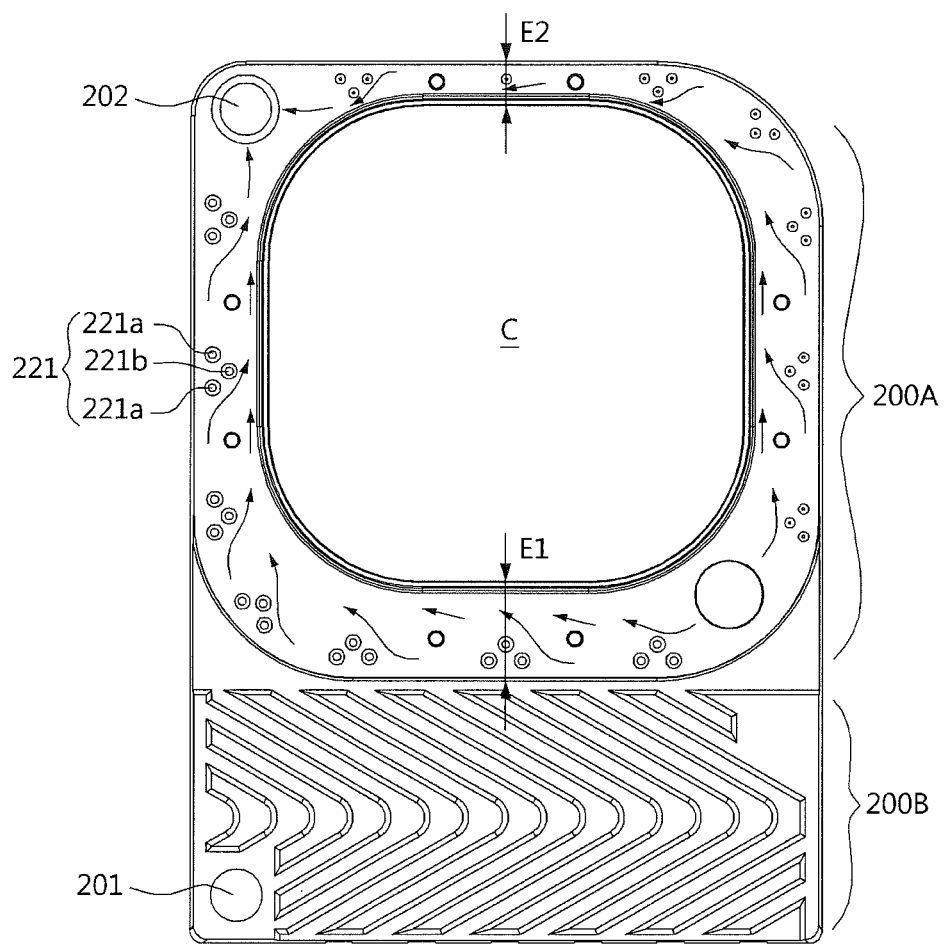

[FIG. 18]
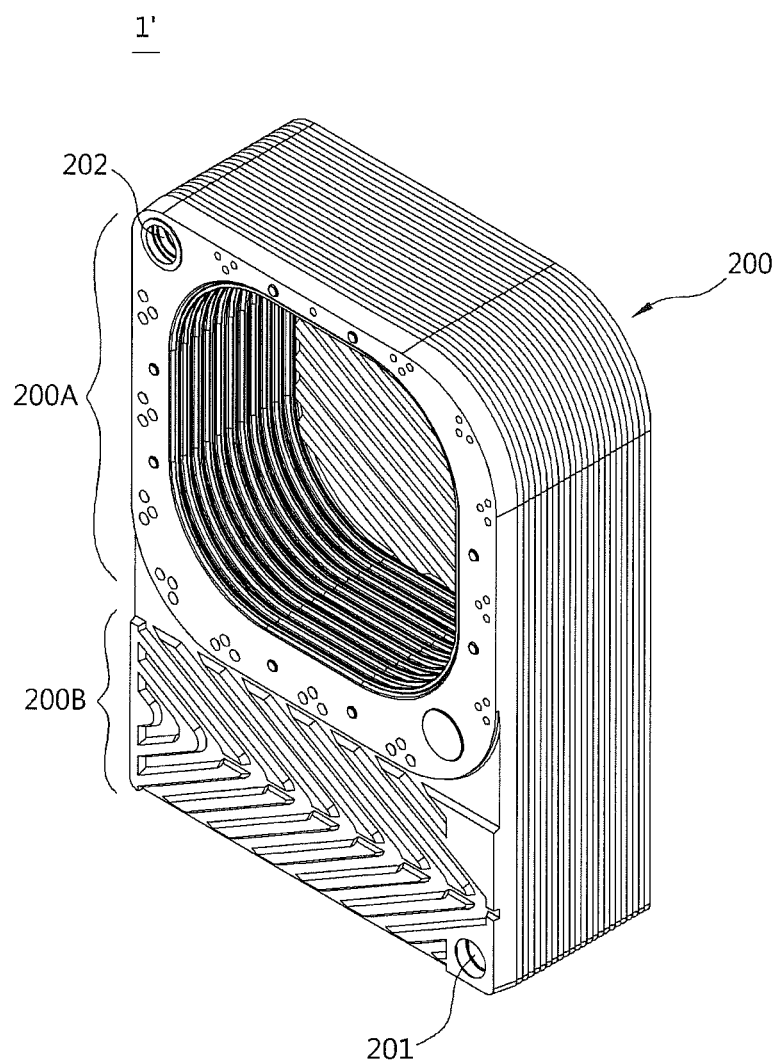

[FIG. 19]
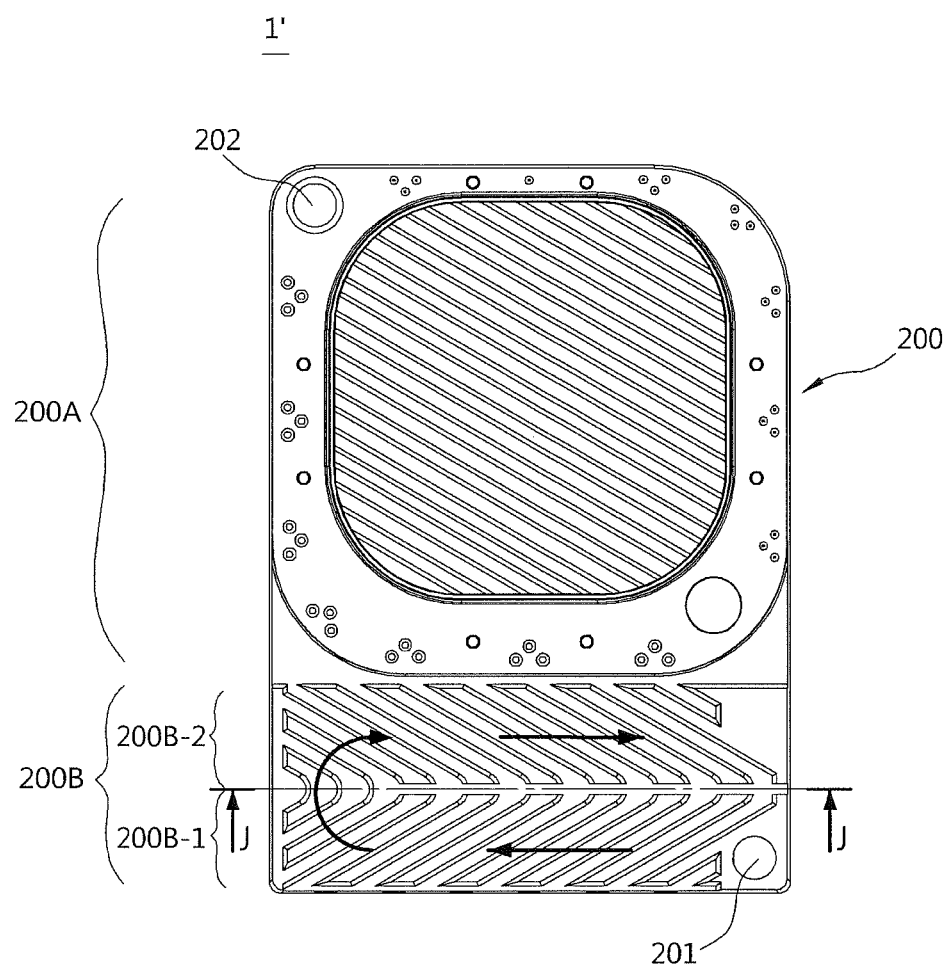

[FIG. 20]
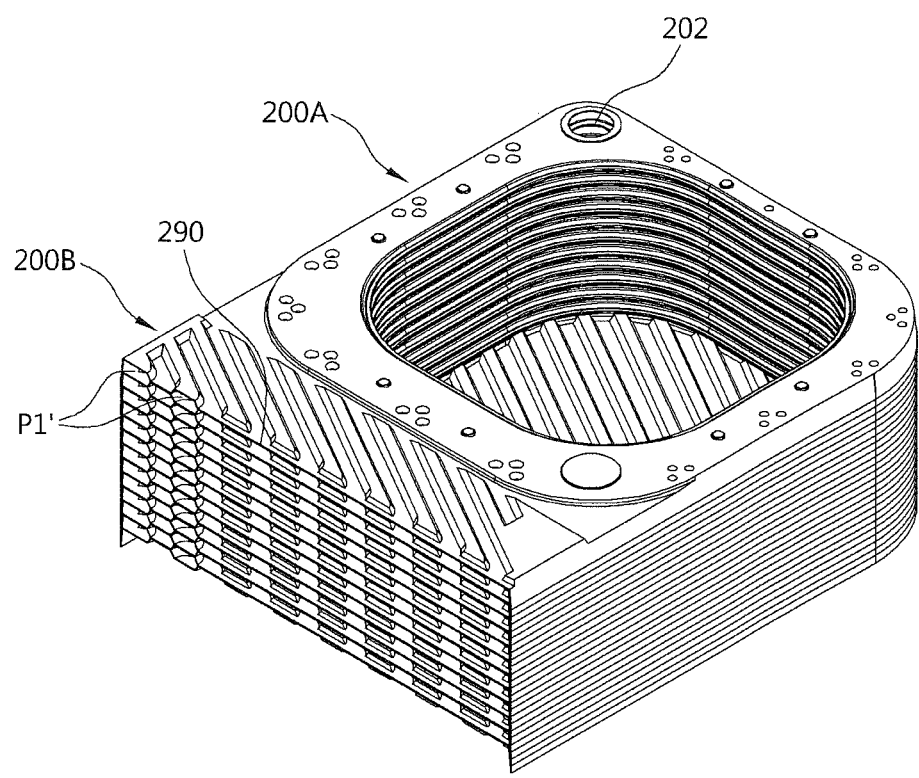

HEAT EXCHANGER

CROSS-REFERENCE TO RELATED APPLICATIONS

This application is a national stage of International Application No. PCT/KR2016/007714, filed Jul. 15, 2016, which claims the benefit of priority to Korean Application No. 10-2015-0104094, filed Jul. 23, 2015 in the Korean Intellectual Property Office, the disclosures of which are incorporated herein in their entireties by reference.

TECHNICAL FIELD

The present invention relates to a heat exchanger, and more particularly, to a heat exchanger having a simplified assembly structure by stacking a plurality of plates to integrally form a sensible heat unit and a latent heat unit, and by integrally forming a case of the heat exchanger and a combustion gas pass-through unit using the stacked plates.

BACKGROUND ART

A boiler used for heating or warm water is a device configured to heat a desired area or supply warm water by heating water or direct water (hereinafter referred to as a "heating medium") being heated by a heat source, and the boiler is configured to include a burner configured to combust a mixture of a gas and air and a heat exchanger configured to transfer combustion heat of a combustion gas to the heating medium.

A boiler produced in an early stage uses a heat exchanger which heats a heating medium using only sensible heat generated when a burner performs a combustion operation, but a condensing boiler, which has a sensible heat exchanger configured to absorb sensible heat of a combustion gas generated in a combustion chamber, and a latent heat exchanger configured to absorb latent heat generated by condensation of water vapor contained in the combustion gas which underwent heat exchange in the sensible heat exchanger, is recently being used to improve thermal efficiency. Such a condensing boiler is being applied to an oil boiler as well as a gas boiler, thereby contributing to an increase in boiler efficiency and a reduction in fuel cost.

As described above, a conventional condensing type heat exchanger including a sensible heat exchanger and a latent heat exchanger is configured with a structure in which a blower, a fuel supply nozzle, and a burner are installed above a housing, and the sensible heat exchanger and the latent heat exchanger, which each have a heat exchange fin coupled to an outer side of a heat exchange pipe, are sequentially installed inside the housing below the burner.

However, in the conventional condensing type heat exchanger, there is a problem in that a volume of the heat exchanger is increased due to the blower being disposed above the housing and the structures of the sensible heat exchanger and the latent heat exchanger which are individually installed inside the housing.

As a prior art for improving heat exchange efficiency and minimizing a volume while resolving such a problem, Korean Registered Patent Nos. 10-1321708 and 10-0813807 each disclose a heat exchanger configured with a burner disposed at a central portion of the heat exchanger and a heat exchange pipe wound around a circumference of the burner in the form of a coil.

The heat exchangers disclosed in the above-described patents each have a configuration in which an outer circumference of a helically wound heat exchange pipe is sealed to provide a flow channel of a combustion gas such that a housing should be separately provided, and thus an installation structure of the heat exchanger becomes complicated.

Further, the conventional heat exchanger has a structural limitation in that a flow path of the heating medium is short, and thus a heat transfer area between the heating medium and combustion gas cannot be widely secured.

DISCLOSURE

Technical Problem

The present invention has been proposed to resolve the above-mentioned problems, and it is an objective of the present invention to provide a heat exchanger having a reduced number of components constituting the heat exchanger and a simplified coupling structure, and capable of reducing flow resistance of a combustion gas and minimizing generation of noise and vibration by integrally configuring an outer wall structure which seals a heating medium flow channel, a combustion gas flow channel, and outer side surfaces of the heating medium flow channel and the combustion gas flow channel.

It is another objective of the present invention to provide a heat exchanger capable of maximizing heat exchange efficiency between a heating medium and a combustion gas while securing a large heat transfer area between the heating medium and the combustion gas due to a flow path of the heating medium being formed to be long in a limited space.

Technical Solution

To implement the above-described objectives, a heat exchanger of the present invention includes a heat exchange unit (200) in which heating medium flow channels through which a heating medium flows in a space between a plurality of plates and combustion gas flow channels through which a combustion gas combusted in a burner (100) flows are alternately formed to be adjacent to each other, wherein the heat exchange unit (200) is configured with a sensible heat unit (200A) configured to surround an outer side of a combustion chamber (C), configured with an area at one side of a plate, and configured to heat the heating medium using sensible heat of the combustion gas generated by combustion of the burner (100); a latent heat unit (200B) configured with an area at the other side of the plate, and configured to heat the heating medium using latent heat of water vapor contained in the combustion gas which undergoes heat exchange in the sensible heat unit (200A); and a flange formed to be bent at an edge of each of the plurality of plates, and a combustion gas pass-through unit (D) through which the combustion gas flowing in the combustion gas flow channel passes is formed at a part of an area of the edge of the plurality of plates in a state in which flanges of adjacent plates overlaps.

Advantageous Effects

In accordance with a heat exchanger of the present invention, a heating medium flow channel and a combustion gas flow channel are formed inside a heat exchange unit configured by stacking a plurality of unit plates, an outer wall structure sealing an outer side surface through which a combustion gas passes is integrally formed therewith such that an installation structure of the heat exchanger can be simplified, and a plurality of combustion gas pass-through units are formed at a lower portion of a latent heat unit such that flow resistance of the combustion gas can be reduced and generation of noise and vibration can be minimized.

Further, a latent heat unit having multiple parallel heating medium flow channels and a sensible heat unit having serial heating medium flow channels are integrally formed by stacking a plurality of unit plates manufactured in a similar pattern, and thus a flow path of the heating medium is formed to be maximally long in a limited space such that heat exchange efficiency between the heating medium and the combustion gas can be maximized.

DESCRIPTION OF DRAWINGS

FIG. 1 is a perspective view of a heat exchanger according to one embodiment of the present invention.

FIG. 2 is a right side view of the heat exchanger according to one embodiment of the present invention.

FIG. 3 is a front view of the heat exchanger according to one embodiment of the present invention.

FIG. 4 is an exploded perspective view of the heat exchanger according to one embodiment of the present invention.

FIG. 5 is an enlarged perspective view of a portion of a unit plate shown in FIG. 4.

FIG. 6 is a perspective view illustrating a flow path of a heating medium passing through a latent heat unit and a sensible heat unit.

FIG. 7 is a perspective view taken along line A-A of FIG. 3.

FIG. 8 is a perspective view taken along line B-B of FIG. 3.

FIG. 9 is a perspective view taken along line C-C of FIG. 3.

FIG. 10 is a perspective view taken along line D-D of FIG. 3.

FIG. 11 is a perspective view taken along line E-E of FIG. 3.

FIG. 12 is a perspective view taken along line F-F of FIG. 3.

FIG. 13 is a perspective view taken along line G-G of FIG. 3.

FIG. 14 is a perspective view taken along line H-H of FIG. 3.

FIG. 15 is a perspective view taken along line I-I of FIG. 3.

FIG. 16 is a perspective view illustrating a state in which a combustion gas pass-through unit is formed at a lower portion of the latent heat unit.

FIG. 17 is a diagram illustrating a state in which the heating medium is guided in a direction toward an inner side of a combustion chamber by a guide unit.

FIG. 18 is a perspective view of a heat exchanger according to another embodiment of the present invention.

FIG. 19 is a front view of FIG. 18.

FIG. 20 is a perspective view taken along line J-J of FIG. 19.

| ** Description of Reference Numerals ** | |
|---|---|
| 1 and 1': heat exchangers | 100: burner |
| 200: heat exchange unit | 200A: sensible heat unit |
| 200B: latent heat unit | 200B-1: first latent heat unit |
| 200B-2: second latent heat unit | 200-1 to 200-12: unit plates |
| 200A-1 to 200a-12: first plates | 200b-1 to 200b-12: second plates |
| 200-A: first plate group | 200-B: second plate group |

| ** Description of Reference Numerals ** | |
|---|---|
| 200-C: third plate group | 201: heating medium inlet |
| 202: heating medium outlet | 210: first plane portion |
| 220: first protrusion | 221: first guide unit |
| 222: first gap maintaining portion | |
| 230: second protrusion | 240: first flange |
| 241: first incised portion | 250: second plane portion |
| 260: first recess | 261: second guide unit |
| 262: second gap maintaining portion | |
| 270: second recess | 280: second flange |
| 281: second incised portion | 290: heating medium blocking unit |
| 300: combustion gas discharge unit | |
| 310: lower cover | 311: condensation discharge pipe |
| 320: combustion gas discharge pipe | |
| A1: first opening | A2: second opening |
| B: water housing cooling unit | B1: first insulating plate |
| B2: second insulating plate | C: combustion chamber |
| D: combustion gas pass-through unit | |
| H1 to H8: through-holes | H3' and H7': first blocked portions |
| H4' and H8': second blocked portions | |
| H3-1 and H4-1: first flanges | H7-1 and H8-1: second flanges |
| P1: latent heat unit heating medium flow channel | |
| P1': heating medium connecting flow channel | |
| P2: latent heat unit combustion gas flow channel | |
| P3: sensible heat unit heating medium flow channel | |
| P4: sensible heat unit combustion gas flow channel | |

MODES OF THE INVENTION

Hereinafter, configurations and operations for preferred embodiments of the present disclosure will be described in detail with reference to the accompanying drawings.

Referring to FIGS. 1 to 6, a heat exchanger 1 according to one embodiment of the present invention includes a burner 100 configured to burn a mixture of air and fuel to generate combustion heat and a combustion gas; a heat exchange unit 200 provided at a circumference of the burner 100 to perform a heat exchange between a heating medium and the combustion gas generated by combustion in the burner 100, and constituted by stacking a plurality of plates; and a combustion gas discharge unit 300 configured to discharge the combustion gas which passes through the heat exchange unit 200.

The burner 100 is a cylindrical burner and is assembled by being inserted into a space of a combustion chamber C provided at the heat exchange unit 200 in a horizontal direction from a front surface, thereby improving convenience of detaching the burner 100 and maintenance work of the heat exchanger 1.

The heat exchange unit 200 is configured with a sensible heat unit 200A configured to surround an outer side of the combustion chamber C to form one side area of each of the plurality of plates and heat the heating medium using sensible heat of the combustion gas generated by the combustion of the burner 100; and a latent heat unit 200B configured to from another side area of each of the plurality of plates and heat the heating medium using latent heat generated when water vapor contained in the combustion gas which undergoes heat exchange in the sensible heat unit 200A is condensed.

The plurality of plates are disposed in an upright structure and stacked in a front-rear direction to allow the sensible heat unit 200A to be disposed at an upper portion and the latent heat unit 200B to be disposed at a lower portion.

The combustion gas discharge unit 300 is configured with a lower cover 310 covering a lower portion of the latent heat unit 200B, and a combustion gas discharge pipe 320 having a side connected to the lower cover 310 and extending upward. A condensation discharge pipe 311 configured to discharge condensation generated at the latent heat unit 200B is connected to a lower portion of the lower cover 310.

Configurations and operations of the plurality of plates, the sensible heat unit 200A, and the latent heat unit 200B, which constitute the heat exchange unit 200, will be described below.

The heat exchange unit 200 is configured such that the plurality of plates are stacked from a front side to a rear side, and the sensible heat unit 200A disposed at the upper portion and the latent heat unit 200B disposed at the lower portion are integrally formed with the plurality of plates.

As one example, the plurality of plates may be configured with first to twelfth unit plates 200-1, 200-2, 200-3, 200-4, 200-5, 200-6, 200-7, 200-8, 200-9, 200-10, 200-11, and 200-12, and the unit plates are configured with first plates 200a-1, 200a-2, 200a-3, 200a-4, 200a-5, 200a-6, 200a-7, 200a-8, 200a-9, 200a-10, 200a-11, and 200a-12, which are disposed at front sides of the unit plates, and second plates 200b-1, 200b-2, 200b-3, 200b-4, 200b-5, 200b-6, 200b-7, 200b-8, 200b-9, 200b-10, 200b-11, and 200b-12, which are disposed at the back sides of the unit plates.

Referring to FIGS. 7 to 13, a latent heat unit heating medium flow channel P1 and a sensible heat unit heating medium flow channel P3 are formed between the first plate and the second plate constituting each of the unit plates, and a latent heat unit combustion gas flow channel P2 and a sensible heat unit combustion gas flow channel P4 are formed between a second plate constituting a unit plate disposed at one side of adjacently stacked unit plates and a first plate constituting a unit plate disposed at the other side thereof.

Referring to FIGS. 4 and 5, the first plate is configured with a first plane portion 210; a first protrusion 220 protruding from one side of the first plane portion 210 toward the front side, having a central portion at which a first opening portion A1 is formed, and configured to constitute the sensible heat unit 200A; a second protrusion 230 protruding from the other side of the first plane portion 210 toward the front side and configured to form the latent heat unit 200B; and a first flange 240 bent from an edge of the first plate toward the rear side.

In the first plate 200a-1 disposed at the foremost position of the first plate, a heating medium inlet 201 is formed at one side of a lower portion of the latent heat unit 200B, and a heating medium outlet 202 is formed at one side of an upper portion of the sensible heat unit 200A.

In the first plates 200a-2 to 200a-12 of the first plates which are sequentially stacked behind the first plate 200a-1 disposed at the foremost position, a first through-hole H1 is formed at the one side of the lower portion of the latent heat unit 200B, a second through-hole H2 is formed at one side of an upper portion of the latent heat unit 200B, a third through-hole H3 is formed at the other side of a lower portion of the sensible heat unit 200A, and a fourth through-hole H4 is formed at the one side of the upper portion of the sensible heat unit 200A.

The second plate is configured with a second plane portion 250; a first recess 260 recessed from one side of the second plane portion 250 to the rear side, having a central portion at which a second opening A2 corresponding to the first opening A1 is formed, and configured to form the sensible heat unit heating medium flow channel P3 between the first protrusion 220 and the first recess 260; a second recess 270 recessed from the other side of the second plane portion 250 to the rear side and configured to form the latent heat unit heating medium flow channel P1 between the second protrusion 230 and the second recess 270; and a second flange 280 bent from an edge of the second plate to the rear side.

In the second plate, a fifth through-hole H5 is formed at the one side of the lower portion of the latent heat unit 200B, a sixth through-hole H6 is formed at the one side of the upper portion of the latent heat unit 200B, a seventh through-hole H7 is formed at the other side of the lower portion of the sensible heat unit 200A, and an eighth through-hole H8 is formed on the one side of the upper portion of the sensible heat unit 200A.

Further, first blocked portions H3' and H7' are respectively formed at the other side of the lower portion of the sensible heat unit 200A in the first plate 200a-9 of the ninth unit plate 200-9 and the second plate 200b-8 of the eighth unit plate 200-8, and second blocked portions H4' and H8' are respectively formed at the one side of the upper portion the sensible heat unit 200A in the first plate 200a-5 of the fifth unit plate 200-5 and the second plate 200b-4 of the fourth unit plate 200-4. The first blocked portions H3' and H7' and the second blocked portions H4' and H8' are configured to change a flow path of the heating medium passing through the sensible heat unit heating medium flow channel P3 to form a serial flow path, and operations thereof will be described below.

Meanwhile, referring to FIGS. 10 and 13, first flanges H3-1 and H4-1 are respectively formed at the through-holes H3 and H4 to protrude toward the sensible heat unit combustion gas flow channel P4, and second flanges H7-1 and H8-1 are respectively formed at the through-holes H7 and H8 to protrude toward the sensible heat unit combustion gas flow channel P4 to be in contact with ends of the first flanges H3-1 and H4-1.

According to the configurations of the first flanges H3-1 and H4-1 and the second flanges H7-1 and H8-1, the sensible heat unit heating medium flow channel P3 and the sensible heat unit combustion gas flow channel P4 are spatially separated and a gap between the sensible heat unit heating medium flow channel P3 and the sensible heat unit combustion gas flow channel P4 may also be constantly maintained.

Further, referring to FIGS. 4 and 15, a water housing cooling unit B configured to provide a heating medium connecting flow channel to allow the heating medium which passes through the heating medium flow channel of the latent heat unit 200B to flow in the heating medium flow channel of the sensible heat unit 200A and insulate the combustion chamber C is formed behind the sensible heat unit 200A.

The water housing cooling unit B is configured such that the heating medium is filled in a space between a first insulating plate B1 formed at the first plate 200a-12 of the unit plate 200-12 disposed at the rearmost position and a second insulating plate B2 formed at the second plate 200b-12 of the unit plate 200-12. Protrusions and recesses each having a comb shape may be formed to intersect each other at the first insulating plate B1 and the second insulating plate B2, and thus turbulence is generated in a flow of the heating medium passing through the water housing cooling unit B.

According to the configuration of the water housing cooling unit B, heat insulation of the combustion chamber C is possible without separate insulation being installed to prevent overheating of the heat exchanger 1, and thus a heating medium connecting flow channel configured to connect the latent heat unit heating medium flow channel P1 and the sensible heat unit heating medium flow channel P3 may be widely secured in a space between the first insulating plate B1 and the second insulating plate B2 such that flow channel resistance of the heating medium may be reduced. Further, the sensible heat unit heating medium flow channel P3 through which the heating medium flows is provided at an outer wall surrounding the combustion chamber C and thus heat insulation of the outer wall of the combustion chamber C is possible such that heat insulation of the combustion chamber C may be achieved over an entire area thereof by the water housing cooling unit B and the sensible heat unit heating medium flow channel P3.

Meanwhile, the second protrusion 230 and the second recess 270 may be formed in comb shapes bent in opposite directions. In this case, when the first plate and the second plate are stacked, the first plane portion 210 and the second plane portion 250 are in contact, the latent heat unit heating medium flow channel P1 through which the heating medium flows is formed between the second protrusion 230 and the second recess 270 which are bent in the opposite directions in one unit plate, and the latent heat unit combustion gas flow channel P2 through which the combustion gas flows is formed between the second recess 270 of one of adjacently stacked unit plates and the second protrusion 230 of the other thereof.

As described above, the second protrusion 230 and the second recess 270 are configured in comb shapes bent in the opposite directions, and thus turbulence is generated in a flow of the heating medium passing through the latent heat unit heating medium flow channel P1 and in a flow of the combustion gas passing through the latent heat unit combustion gas flow channel P2 such that heat exchange efficiency can be increased.

Referring to FIGS. 7 and 16, when the first plate and the second plate are stacked, the first flange 240 and the second flange 280 partially overlap each other, and the overlapping portions are weld-coupled such that an outer wall of the heat exchange unit 200 is formed.

Further, in a state in which the first flange 240 and the second flange 280 of adjacent plates overlap, a combustion gas pass-through unit D through which the combustion gas flowing in the latent heat unit combustion gas flow channel P2 passes toward the combustion gas discharge unit 300 is formed.

To this end, a plurality of first incised portions 241 are formed at a combustion gas discharge side of the first flange 240, a plurality of second incised portions 281 are formed at a combustion gas discharge side of the second flange 280, and the combustion gas pass-through unit D is formed at a portion of each of the first incised portion 241 and the second incised portion 281 when the first plate and the second plate are stacked.

The plurality of combustion gas pass-through units D are formed and spaced a predetermined distance apart at the lower portion of the latent heat unit 200B in horizontal and vertical directions, and thus the combustion gas which passes through the latent heat unit 200B may be discharged at a uniform flow rate across the entire area of the lower portion of the latent heat unit 200B such that the plurality of combustion gas pass-through units D serve to reduce flow resistance of the combustion gas passing through the latent heat unit 200B to be discharged to the combustion gas discharge unit 300 and prevent noise and vibration.

Meanwhile, guide units 221 and 261 configured to guide the heating medium to flow toward the center of the combustion chamber C are formed at the heating medium flow channel P3 of the sensible heat unit 200A. A plurality of guide units 221 and a plurality of guide units 261 are formed and spaced apart from each other at an outer side portion of the sensible heat unit 200A in a circumferential direction thereof.

Here, the outer side portion of the sensible heat unit 200A is an area between an intermediate portion and an outer end of the sensible heat unit 200A in a width direction, and refers to an area adjacent to the outer end thereof.

The guide units 221 and 261 include the plurality of first guide units 221 protruding from the first plate toward the sensible heat unit heating medium flow channel P3, and the plurality of second guide units 261 protruding from the second plate toward the sensible heat unit heating medium flow channel P3 and formed at positions corresponding to the plurality of guide units 221.

Referring to FIGS. 11 and 17, a protruding end of the first guide unit 221 and a protruding end of the second guide unit 261 are in contact with each other to enhance coupling strength between the first plate and the second plate.

The first guide unit 221 may be configured with a first guide 221a disposed on a front side on the basis of a flow direction of the heating medium, a second guide 221b disposed to be spaced in a diagonal direction from a rear side of the first guide 221a toward the combustion chamber C, and a third guide 221c disposed to be spaced apart from a rear side of the guide 221a, and the second guide unit 261 may also be configured to correspond to the first guide unit 221.

With such configurations of the guide units 221 and 261, as indicated by arrows in FIG. 17, since a flow path of the heating medium flowing along the sensible heat unit heating medium flow channel P3 is guided by the guide units 221 and 261 in a direction toward the combustion chamber C, a distance between the burner 100 installed inside the combustion chamber C and the heating medium is shortened such that combustion heat of the burner 100 can be effectively transferred to the heating medium and generation of turbulence is promoted in the flow of the heating medium such that heat transfer efficiency can be improved.

Referring to FIG. 12, a plurality of first gap maintaining portions 222 protruding toward the sensible heat unit combustion gas flow channel P4 are formed at the first protrusion 220, and a plurality of second gap maintaining portions 262 are formed at the first recess 260 at positions corresponding to the plurality of first gap maintaining portions 222 to protrude toward the sensible heat unit combustion gas flow channel P4. A protruding end of the first gap maintaining portion 222 and a protruding end of the second gap maintaining portion 262 are formed to be in contact with each other.

With such configurations of the first gap maintaining portion 222 and the second gap maintaining portion 262, a gap of the sensible heat unit combustion gas flow channel P4 can be constantly maintained, and the coupling strength between the first plate and the second plate can be enhanced in association with the above-described configurations of the first flanges H3-1 and H4-1 and the second flanges H7-1 and H8-1.

Meanwhile, in order to form a local laminar flow in the combustion gas flowing through the sensible heat unit combustion gas flow channel P4 to improve heat exchange efficiency between the combustion gas and the heating medium, a gap, which is a vertically spaced distance, of the sensible heat unit combustion gas flow channel P4 is preferably set to be in a range of 0.8 to 1.6 mm.

Further, as shown in FIGS. 11, 12, and 15, one of the ends of the first plate and the second plate, which are disposed at a circumference of the combustion chamber C, is bent, seamed, and weld-coupled to be in close contact with the other end. In this case, a length of a seamed end S of the first plate and the second plate is preferably set to be in a range of 1 to 5 mm to prevent overheating of the seamed end S and maintain welding quality.

Meanwhile, referring to FIG. 17, a width E1 of a side area facing the latent heat unit 200B is preferably formed to be greater than a width E2 of a side area opposite the latent heat unit 200B among areas of the plate constituting the sensible heat unit 200A. This is because most of the combustion gas generated in the combustion chamber C flows toward the latent heat unit 200B and thus the width E1 of the side area facing the latent heat unit 200B is formed to be greater than the width E2 of the side area opposite the latent heat unit 200B to secure a wider heat transfer area in an area in which heat exchange is actively performed.

Flow paths of the combustion gas and the heating medium in the heat exchanger 1 according to the present invention will be described below.

The flow path of the combustion gas will be described first with reference to FIG. 14. In FIG. 14, arrows indicate a flow direction of the combustion gas.

The combustion gas generated by combustion in the burner 100 flows radially outward inside the combustion chamber C and passes through the sensible heat unit combustion gas flow channel P4 formed between the unit plates of the sensible heat unit 200A, and sensible heat of the combustion gas is transferred to the heating medium passing through the sensible heat unit heating medium flow channel P3 while the combustion gas passes through the sensible heat unit combustion gas flow channel P4.

A combustion gas moving downward via the sensible heat unit combustion gas flow channel P4 moves downward through the latent heat unit combustion gas flow channel P2 formed between the unit plates of the latent heat unit 200B, and latent heat of condensation contained in water vapor of the combustion gas is transferred to the heating medium passing through the latent heat unit heating medium flow channel P1 to preheat the heating medium while the combustion gas moves downward through the latent heat unit combustion gas flow channel P2.

A combustion gas reaching a lower portion of the latent heat unit combustion gas flow channel P2 passes through the plurality of combustion gas pass-through units D, which are formed at the lower portion of the latent heat unit 200B at regular intervals, and is discharged downward. At this point, since the combustion gas is divided and discharged at a uniform flow rate across the entire lower area of the latent heat unit 200B due to the plurality of combustion gas pass-through units D formed at regular intervals, a phenomenon in which the combustion gas is biased to one side is prevented such that flow resistance of the combustion gas can be reduced and generation of noise and vibration can be also minimized.

The combustion gas passing through the plurality of combustion gas pass-through units D is discharged upward through the lower cover 310 and the combustion gas discharge pipe 320, and condensation is discharged through the condensation discharge pipe 311 connected to the lower portion of the lower cover 310.

The flow path of the heating medium will be described below with reference to FIGS. 4 and 6. In FIGS. 4 and 6, arrows indicate a flow direction of the heating medium.

The flow path of the heating medium in the latent heat unit 200B will be described first.

A heating medium flowing in the heating medium inlet 201 formed at the first plate 200*a*-1, which is disposed at a front surface of the plurality of plates, sequentially passes through the first through-hole H1 and the fifth through-hole H5 formed at each of the plurality of plates 200*b*-1 to 200*a*-12, which are stacked behind the first plate 200*a*-1, to flow toward the water housing cooling unit B provided between the first plate 200*a*-12 and the second plate 200*b*-12 of the unit plate 200-12 disposed at the rearmost position. Further, a portion of the heating medium sequentially passing through the first through-hole H1 and the fifth through-hole H5 passes through the latent heat unit heating medium flow channel P1 provided inside each of the unit plates 200-1 through 200-11 in a parallel structure, sequentially passes through the second through-hole H2 and the sixth through-hole H6 which are diagonally disposed with respect to the first through-hole H1 and the fifth through-hole H5, respectively, and flows toward the water housing cooling unit B provided between the first plate 200*a*-12 and the second plate 200*b*-12.

As described above, since the heating medium flow channels of the latent heat unit 200B are provided in a multiple parallel structure, flow resistance of the heating medium passing through the latent heat unit heating medium flow channel P1 is reduced, and, since the latent heat unit heating medium flow channel P1 and the latent heat unit combustion gas flow channel P2 are alternately disposed to be adjacent to each other, the heating medium passing through the latent heat unit heating medium flow channel P1 may be preheated by effectively absorbing latent heat of the water vapor contained in the combustion gas.

Next, the flow path of the heating medium in the sensible heat unit 200A will be described.

The heating medium which passes through the water housing cooling unit B absorbs heat transmitted to the rear side of the combustion chamber C and then sequentially passes through a third through-hole H3 formed at the first plate 200*a*-12 of the twelfth unit plate 200-12 and third through-holes H3 and seventh through-holes H7 formed at the plates 200*b*-11 to 200*b*-9 stacked in front of the twelfth unit plate 200-12.

Further, since the first blocking portions H3' and H7' are formed at the plates 200*a*-9 and 200*b*-8 stacked at the front side, the portion of the heating medium sequentially passing through the third through-holes H3 and the seventh through-holes H7 and flowing into the sensible heat unit heating medium flow channel P3 formed at each of the unit plates 200-12 to 200-9 branches off in both directions, flows in a direction toward the fourth through-hole H4 and the eighth through-hole H8 which are each disposed to be diagonal to the third through-hole H3 and the seventh through-hole H7, and then sequentially passes through the fourth through-hole H4 and the eighth through-hole H8 to flow to the front side.

The heating medium which passes through the fourth through-hole H4 and the eighth through-hole H8 of the plates 200*a*-9 and 200*b*-8 sequentially passes through a fourth through-hole H4 and an eighth through-hole H8 which are formed at each of the plates 200*a*-8 to 200*b*-5 sequentially stacked in front of the 200*a*-9 and 200*b*-8.

Further, since the second blocked portions H4' and H8' are formed at the plates 200*a*-5 and 200*b*-4 stacked at the front side, the portion of the heating medium sequentially passing through the fourth through-holes H4 and the eighth through-holes H7 and flowing into the sensible heat unit heating medium flow channel P3 formed at each of the unit plates 200-8 to 200-5 branches off in both directions, flows in a direction toward the third through-hole H3 and the seventh through-hole H7 which are each disposed diagonal to the fourth through-hole H4 and the eighth through-hole H8, and then sequentially passes through the third through-hole H3 and the seventh through-hole H7 to flow to the front side.

The heating medium which passes through the third through-hole H3 and the seventh through-hole H7 of the plates 200a-5 and 200b-4 sequentially passes through the third through-hole H3 and the seventh through-hole H7 which are formed at each of the plates 200a-4 to 200b-1 sequentially stacked in front of the plates 200a-5 and 200b-4.

Further, since portions of the plate 200a-1 disposed at the foremost position and corresponding to the third through-hole H3 and the seventh through-hole H7 are blocked, the portion of the heating medium sequentially passing through the third through-holes H3 and the seventh through-holes H7 and flowing into the sensible heat unit heating medium flow channel P3 formed at each of the unit plates 200-4 to 200-1 branches off in both directions, flows in a direction toward the fourth through-hole H4 and the eighth through-hole H8 which are each disposed diagonal to the third through-hole H3 and the seventh through-hole H7, and then sequentially passes through the fourth through-hole H4 and the eighth through-hole H8 to be discharged through the heating medium outlet 202 formed at the plate 200a-1 disposed at the foremost position.

FIG. 6 illustrates the above-described flow path of the heating medium in the latent heat unit 200B and the sensible heat unit 200A as a unit of a plate group, and in the present embodiment, an example in which a first plate group 200-A, a second plate group 200-B, and a third plate group 200-C, which are each configured with a set of eight plates, are configured from the front side to the rear side, has been described, but the total number of stacked plates and the number of plates constituting each of the plate groups in the present invention may be changed and implemented.

As is described above, since the flow paths of the heating medium in the sensible heat unit 200A are configured to be connected in series, the flow path of the heating medium may be formed to be maximally long within a limited space of the sensible heat unit 200A such that heat exchange efficiency between the heating medium and the combustion gas can be significantly improved.

A configuration of a heat exchanger 1' according to another embodiment of the present invention will be described below with reference to FIGS. 18 to 20.

The heat exchanger 1' according to the present embodiment differs from the heat exchanger 1 according to the above-described embodiment in a heating medium flow channel of a latent heat unit 200B, and the other configurations thereof are the same as those of heat exchanger 1. Therefore, the same reference numerals will be assigned to the same members as those of the above-described embodiment, and descriptions thereof will be omitted.

In the heat exchanger 1' according to the present embodiment, the latent heat unit 200B is divided into a first latent heat unit 200B-1 and a second latent heat unit 200B-2 on both sides of a heating medium blocking unit 290, and heating medium flow channels of the first latent heat unit 200B-1 and the second latent heat unit 200B-2 are configured in a communicating structure through a heating medium connecting flow channel P1' formed at one side of the heating medium blocking unit 290.

Through-holes H1 and H5 communicating with a heating medium inlet 201 and a heating medium flow channel of the first latent heat unit 200B-1 are formed at one side of a lower portion of the first latent heat unit 200B-1, and through-holes H2 and H6 communicating with a heating medium flow channel of the second latent heat unit 200B-2 and a sensible heat unit heating medium flow channel P3 are formed at one side of an upper portion of the second latent heat unit 200B-2.

With such a configuration, as indicated by arrows in FIG. 19, a heating medium flowing in through the heating medium inlet 201 moves to one side along the heating medium flow channel of the first latent heat unit 200B-1, passes through the heating medium connecting flow channel P1', is reversed in its flow direction to move to the other side along the heating medium flow channel of the second latent heat unit 200B-2, and then flows along a water housing cooling unit B and the sensible heat unit heating medium flow channel P3 like in the above-described embodiment.

According to the present embodiment, the heating medium flow channel in the latent heat unit 200B can be formed to be longer than in the above-described embodiment, and thus absorption efficiency of latent heat can be further improved.

The invention claimed is:
1. A heat exchanger comprising:
a heat exchange unit (200) in which heating medium flow channels through which a heating medium flows in a space between a plurality of plates and combustion gas flow channels through which a combustion gas combusted in a burner (100) flows are alternately formed to be adjacent to each other,
wherein the heat exchange unit (200) is configured with a sensible heat unit (200A) configured to surround an outer side of a combustion chamber (C), configured with an area at one side of each of the plates, and configured to heat the heating medium using sensible heat of the combustion gas generated by combustion of the burner (100); a latent heat unit (200B) configured with an area at the other side of each of the plates and configured to heat the heating medium using latent heat of water vapor contained in the combustion gas which undergoes heat exchange in the sensible heat unit (200A); and a plurality of flanges each of which is formed to be bent at an edge of each of the plurality of plates, and a combustion gas pass-through unit (D) through which the combustion gas flowing in the combustion gas flow channel passes is formed at a part of an area of the edge of the plurality of plates in a state in which flanges of adjacent plates overlap so that the combustion gas is distributed and discharged at a uniform flow rate through the combustion gas pass-through unit (D),
wherein the combustion gas pass-through unit (D) is formed spaced apart at regular intervals in the vertical direction and formed spaced apart at predetermined intervals in the horizontal direction.
2. The heat exchanger of claim 1, wherein the plurality of plates are formed by stacking a plurality of unit plates each having a first plate and a second plate which are stacked, the heating medium flow channel is formed between the first plate and the second plate of the unit plate, and the combustion gas flow channel is formed between a second plate constituting a unit plate disposed at one side of adjacently stacked unit plates and a first plate of a unit plate disposed at the other side thereof.

3. The heat exchanger of claim 2, wherein the flanges of adjacent plates consist of a first flange (240) bent to a rear side at an edge of the first plate, and a second flange (280) bent to a rear side at an edge of the second plate and partially overlapping the first flange (240) and configured to form an outer wall of the heat exchange unit (200) together with the first flange (240).

4. The heat exchanger of claim 3, wherein a plurality of first incised portions (241) are formed at a combustion gas discharge side of the first flange (240), a plurality of second incised portions (281) are formed at a combustion gas discharge side of the second flange (280), and the combustion gas pass-through unit (D) is formed at a part of an area of each of the first incised portion (241) and the second incised portion (281) when the first plate and the second plate are stacked.

5. The heat exchanger of claim 3, wherein the overlapping portions of the first flange (240) and the second flange (280) are weld-coupled to each other.

6. The heat exchanger of claim 2, wherein the first plate is configured with a first plane portion (210), a first protrusion (220) protruding from one side of the first plane portion (210) to a front side and having a first opening (A1) formed at a center of the first protrusion (220) to constitute the sensible heat unit (200A), and a second protrusion (230) protruding forward from the other side of the first plane portion (210) to the front side and configured to form the latent heat unit (200B), and
the second plate is configured with a second plane portion (250), a first recess (260) recessed from one side of the second plane portion (250) to a rear side, configured to form a sensible heat unit heating medium flow channel (P3) between the first protrusion (220) and the first recess (260), and having a second opening (A2) corresponding to the first opening (A1), and a second recess (270) recessed from the other side of the second plane portion (250) to the rear side and configured to form a latent heat unit heating medium flow channel (P1) between the second protrusion (230) and the second recess (270).

7. The heat exchanger of claim 6, wherein, when the first plate and the second plate are stacked, the first plane portion (210) and the second plane portion (250) are in contact with each other, and the second protrusion (230) and the second recess (270) are configured to be bent in opposite directions.

8. The heat exchanger of claim 6, wherein a plurality of first gap maintaining portions (222) protruding toward the combustion gas flow channel are formed at the first protrusion (220), and a plurality of second gap maintaining portions (262) are formed at the first recess (260) at positions corresponding to the plurality of first gap maintaining portions (222) to protrude toward the combustion gas flow channel.

9. The heat exchanger of claim 8, wherein a protruding end of each of the plurality of first gap maintaining portions (222) and a protruding end of each of the plurality of second gap maintaining portions (262) are formed to be in contact with each other.

10. The heat exchanger of claim 1, wherein each of the plates has an upright structure such that the sensible heat unit (200A) is disposed at an upper portion and the latent heat unit (200B) is disposed at a lower portion, and the burner (100) is assembled by being inserted into a space of the combustion chamber (C) in a horizontal direction from a front surface thereof.

11. The heat exchanger of claim 10, wherein:
the combustion gas pass-through unit (D) is formed at a lower portion of the latent heat unit (200B), and
a combustion gas discharge unit (300) having a condensation discharge outlet (311) formed thereat is connected to a lower portion of the combustion gas pass-through unit (D).

12. The heat exchanger of claim 1, wherein each of the plates constituting the sensible heat unit (200A) is formed such that a width (E1) of a side area facing the latent heat unit (200B) is formed to be larger than that (E2) of an area opposite the latent heat unit (200B).

13. The heat exchanger of claim 1, wherein:
the latent heat unit (200B) is configured with a heating medium inlet (201) into which the heating medium flows, and a plurality of latent heat unit heating medium flow channels (P1) formed between a plurality of plates in parallel thereto and configured to communicate with the heating medium inlet (201), and
the sensible heat unit (200A) is configured with a heating medium outlet (202) through which the heating medium flows and a plurality of sensible heat unit heating medium flow channels (P3) formed between the plurality of plates and connected in series between the plurality of latent heat unit heating medium flow channels P1 and the heating medium outlet (202).

14. The heat exchanger of claim 13, wherein:
a sensible heat unit combustion gas flow channel (P4) is provided between the sensible heat unit heating medium flow channels (P3), and
a latent heat unit combustion gas flow channel (P2) communicating with the sensible heat unit combustion gas flow channel (P4) is provided between the latent heat unit heating medium flow channels (P1).

15. The heat exchanger of claim 13, wherein:
first through-holes (H1 and H5) provided at one side of the latent heat unit (200B) and second through-holes (H2 and H6) provided at the other side, which communicate with the latent heat unit heating medium flow channels (P1), are diagonally formed at the latent heat unit (200B) to connect the latent heat unit heating medium flow channels (P1) in parallel, and
third through-holes (H3 and H7) provided at one side of the sensible heat unit (200A) and fourth through-holes (H4 and H8) provided at the other side thereof, which communicate with the sensible heat unit heating medium flow channels (P3), are diagonally formed at the sensible heat unit (200A) to connect the sensible heat unit heating medium flow channels (P3) in series.

16. The heat exchanger of claim 13, wherein:
the latent heat unit (200B) is divided into a first latent heat unit (200B-1) and a second latent heat unit (200B-2) on both sides of a heating medium blocking unit (290),
heating medium flow channels of the first latent heat unit (200B-1) and the second latent heat unit (200B-2) communicate through a heating medium connecting flow channel (P1') formed at one side of the heating medium blocking unit (290),
first through-holes (H1 and H5) communicating with the heating medium inlet (201) and the heating medium flow channel of the first latent heat unit (200B-1) are formed at one side of the first latent heat unit (200B-1), and second through-holes (H2 and H6) communicating with the heating medium flow channel of the second latent heat unit (200B-2) and the sensible heat unit heating medium flow channel (P3) are formed at one side of the second latent heat unit (200B-2).

17. The heat exchanger of claim 15, wherein a heating medium flowing into the sensible heat unit heating medium flow channel (P3) through the third through-holes (H3 and H7) provided at the one side thereof branches off in both sides directions and flows toward the fourth through-holes (H4 and H8) formed at the opposite side in a diagonal direction; and the heating medium flowing into the sensible heat unit heating medium flow channel (P3) through the fourth through-holes (H4 and H8) branches off in both sides directions and flows toward the through-holes (H3 and H7) formed at the one side thereof in a diagonal direction.

18. The heat exchanger of claim 17, wherein first blocked portions (H3' and H7') configured to guide the heating medium, which flows into the sensible heat unit heating medium flow channel (P3) through the third through-holes (H3 and H7) provided at the one side thereof, to flow toward the fourth through-holes (H4 and H8) formed at the other side thereof in the diagonal direction; and second blocked portions (H4' and H8') configured to guide the heating medium, which flows into the sensible heat unit heating medium flow channel (P3) through the fourth through-holes (H4 and H8) provided at the other side thereof, to flow toward the third through-holes (H3 and H7) formed at the one side thereof in the diagonal direction are formed at the sensible heat unit (200A).

19. The heat exchanger of claim 15, wherein the third through-holes (H3 and H7) are at least partially defined by first flanges (H3-1) and second flanges (H7-1), which protrude toward the combustion gas flow channel and the ends of the first flanges (H3-1) and second flanges (H7-1) are in contact with each other, and the fourth through-holes (H4 and H8) are at least partially defined by third flanges (H4-1) and fourth flanges (H8-1), which protrude toward the combustion gas flow channel and the ends of the fifth flanges (H4-1) and sixth flanges (H8-1) are in contact with each other.

* * * * *